US012037668B2

(12) United States Patent
Hanada et al.

(10) Patent No.: US 12,037,668 B2
(45) Date of Patent: Jul. 16, 2024

(54) POWDER MAGNETIC CORE AND METHOD FOR PRODUCING THE SAME

(71) Applicant: Alps Alpine Co., Ltd., Tokyo (JP)

(72) Inventors: Akio Hanada, Miyagi-ken (JP); Koichi Fujita, Miyagi-ken (JP); Seiichi Abiko, Miyagi-ken (JP); Hisato Koshiba, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 548 days.

(21) Appl. No.: 17/379,666

(22) Filed: Jul. 19, 2021

(65) Prior Publication Data

US 2021/0350962 A1 Nov. 11, 2021

Related U.S. Application Data

(63) Continuation of application No. PCT/JP2020/006874, filed on Feb. 20, 2020.

(30) Foreign Application Priority Data

Feb. 22, 2019 (JP) ................................ 2019-030756

(51) Int. Cl.

| | |
|---|---|
| ***C22C 45/02*** | (2006.01) |
| ***B22F 1/08*** | (2022.01) |
| ***B22F 1/102*** | (2022.01) |
| ***B22F 1/16*** | (2022.01) |
| ***B22F 3/00*** | (2021.01) |
| ***B22F 3/02*** | (2006.01) |
| ***B22F 3/24*** | (2006.01) |
| ***H01F 1/153*** | (2006.01) |
| ***H01F 1/22*** | (2006.01) |
| ***H01F 1/33*** | (2006.01) |
| ***H01F 27/255*** | (2006.01) |
| ***H01F 41/02*** | (2006.01) |

(52) U.S. Cl.

CPC ................ *C22C 45/02* (2013.01); *B22F 1/08* (2022.01); *B22F 1/102* (2022.01); *B22F 1/16* (2022.01); *B22F 3/00* (2013.01); *B22F 3/02* (2013.01); *B22F 3/24* (2013.01); *H01F 1/15308* (2013.01); *H01F 1/22* (2013.01); *H01F 1/33* (2013.01); *H01F 27/255* (2013.01); *H01F 41/0246* (2013.01); *B22F 2003/248* (2013.01); *B22F 2301/35* (2013.01); *B22F 2998/10* (2013.01)

(58) Field of Classification Search

CPC ... C22C 45/02; H01F 1/22; H01F 1/33; H01F 1/15308; H01F 27/255; H01F 41/0246; B22F 1/16; B22F 1/08; B22F 1/24; B22F 2003/248; B22F 2301/35; B22F 2998/10

See application file for complete search history.

(56) References Cited

U.S. PATENT DOCUMENTS

2017/0162307 A1 6/2017 Ishida

FOREIGN PATENT DOCUMENTS

| | | | |
|---|---|---|---|
| JP | 2000-30925 | | 1/2000 |
| JP | 2011-38133 | * | 2/2011 |
| JP | 2011-40473 | * | 2/2011 |
| JP | 2018-198319 | | 12/2018 |
| WO | 2016/035478 | | 3/2016 |
| WO | 2016/056351 | | 4/2016 |
| WO | 2017/086148 | | 5/2017 |

OTHER PUBLICATIONS

International Search Report from International Application No. PCT/JP2020/006874 dated Apr. 21, 2020.

* cited by examiner

*Primary Examiner* — C Melissa Koslow

(74) *Attorney, Agent, or Firm* — Beyer Law Group LLP

(57) ABSTRACT

A powder magnetic core containing a magnetic particle of an Fe-based Cr-containing amorphous alloy and an organic binding substance is provided as a powder magnetic core with a small loss and high initial permeability. The depth profile of the composition determined from the surface of the magnetic particle in the powder magnetic core has the following characteristics. (1) An oxygen-containing region with an O/Fe ratio of 0.1 or more can be defined from the surface of the magnetic particle, and the oxygen-containing region has a depth of 35 nm or less from the surface. (2) A carbon-containing region with a C/O ratio of 1 or more can be defined from the surface of the magnetic particle, and the carbon-containing region has a depth of 5 nm or less from the surface. (3) The oxygen-containing region has a Cr-concentrated portion with a bulk Cr ratio of more than 1.

8 Claims, 19 Drawing Sheets

POWDER MAGNETIC CORE AND METHOD FOR PRODUCING THE SAME

CLAIM OF PRIORITY

This application is a Continuation of International Application No. PCT/JP2020/006874 filed on Feb. 20, 2020, which claims benefit of Japanese Patent Application No. 2019-030756 filed on Feb. 22, 2019. The entire contents of each application noted above are hereby incorporated by reference.

BACKGROUND OF THE INVENTION

1. Field of the Invention

The present invention relates to a powder magnetic core and a method for producing the powder magnetic core.

2. Description of the Related Art

High-frequency electronic components, such as choke coils, are preferably magnetic materials that can easily be miniaturized and made highly efficient in response to the miniaturization of electrical and electronic devices. A powder magnetic core formed by compacting a powder containing an amorphous material composed of an Fe—Si—B alloy and an amorphous soft magnetic material exemplified by a metallic glass material (in the present specification, a particle composed of a soft magnetic material is referred to as a "magnetic particle") together with an insulating binder has a higher saturation magnetic flux density than a soft magnetic ferrite and is therefore advantageous to miniaturization. Furthermore, the insulating binder binds magnetic particles together and ensures insulation between the magnetic particles. Thus, even when used in a high-frequency region, the powder magnetic core has a relatively small iron loss, a small temperature rise, and is suitable for miniaturization.

The amorphous soft magnetic material constituting the magnetic particle is used after heat treatment to improve the magnetic characteristics (to relieve strain caused by powder compacting, etc.). Thus, the insulating binder should withstand the heat treatment.

When a crystalline magnetic particle, such as an iron particle, a SiFe particle, a Sendust particle, or a Permalloy particle, is used as the magnetic particle, a silicone resin may be used as an insulating binder to form a powder magnetic core, and the silicone resin in the formed product may be converted into $SiO_2$ by heat treatment at approximately 700° C. during or after the forming (Japanese Unexamined Patent Application Publication No. 2000-30925).

Although a powder magnetic core with high mechanical strength and heat resistance can be produced by the method disclosed in Japanese Unexamined Patent Application Publication No. 2000-30925, the heating at approximately 700° C. to convert the silicone resin causes crystallization when an amorphous magnetic powder with high magnetic performance is used, and the method disclosed in Japanese Unexamined Patent Application Publication No. 2000-30925 cannot be applied.

For powder magnetic cores containing an amorphous magnetic powder, the upper limit of heat treatment, if performed, is approximately 500° C. to prevent crystallization of the magnetic material. To provide a powder magnetic core with high heat resistance even when heat treatment is performed under such heating conditions, Japanese Patent No. 6093941 discloses a powder magnetic core containing a soft magnetic powder and an insulating resin material, wherein the resin of the resin material contains an acrylic resin, and a peak based on a first ion composed of at least one type of ion represented by $C_nH_{2n-1}O_2^-$ (n=11 to 20) is observed in TOF-SIMS measurement of the powder magnetic core under the following conditions.

Radiation ions: $Bi^{3+}$

Accelerating voltage: 25 keV

Irradiation current: 0.3 pA

Irradiation mode: bunching mode

SUMMARY OF THE INVENTION

The present invention provides a heat-resistant powder magnetic core with a small loss and high initial permeability. The present invention also provides a method for producing a powder magnetic core with such good magnetic characteristics.

One aspect of the present invention to solve the above problems is a powder magnetic core that contains a magnetic particle of an Fe-based Cr-containing amorphous alloy and an organic binding substance. When the depth profile of the composition is determined from the surface of the magnetic particle in the powder magnetic core, the depth profile may have the following characteristics: An oxygen-containing region in which the ratio of the O concentration (unit: atomic percent) to the Fe concentration (unit: atomic percent) (also referred to as the "O/Fe ratio" in the present specification) is 0.1 or more can be defined from the surface of the magnetic particle, and the oxygen-containing region has a depth of 35 nm or less from the surface of the magnetic particle. A carbon-containing region in which the ratio of the C concentration (unit: atomic percent) to the O concentration (also referred to as the "C/O ratio" in the present specification) is 1 or more can be defined from the surface of the magnetic particle, and the carbon-containing region has a depth of 5 nm or less from the surface of the magnetic particle. The oxygen-containing region has a portion (also referred to as a "Cr-concentrated portion" in the present specification) in which the ratio of the Cr concentration (unit: atomic percent) to the Cr content (unit: atomic percent) in the alloy composition of the magnetic particle (also referred to as a "bulk Cr ratio" in the present specification) is more than 1.

The O/Fe ratio is an indicator of the degree of oxidation of the magnetic particle at the corresponding depth. An O/Fe ratio of 0.1 or more at the measurement depth can indicate the oxidation of Fe at the measurement surface. Thus, a region with an O/Fe ratio of 0.1 or more in the depth profile can be defined as an oxygen-containing region. When the oxygen-containing region can be defined, the magnetic particle may be oxidized, and an oxide film may be formed. The oxide film formed on the surface of the magnetic particle can function as an insulating layer between contiguous magnetic particles. Thus, when the oxygen-containing region can be defined from the surface of the magnetic particle, the magnetic particle can have an appropriate insulating layer on its surface. Consequently, the powder magnetic core containing the magnetic particle has good magnetic characteristics and in particular has a decreased iron loss Pcv.

When the depth of the oxygen-containing region from the surface of the magnetic particle (sometimes referred to as a "thickness" in the present specification) is more than 35 nm, the uniformity of the oxide film formed on the surface of the magnetic particle tends to decrease. This decreases the degree of insulation of each magnetic particle and relatively increases the iron loss Pcv. To consistently prevent the increase in iron loss Pcv, the thickness of the oxygen-containing region in the magnetic particle may preferably be 30 nm or less, more preferably 25 nm or less.

A magnetic particle according to the present invention is formed of an Fe-based Cr-containing amorphous alloy, and Cr in the alloy is concentrated in an oxide film on the surface of the magnetic particle and contributes to the formation of a uniform oxide film. More specifically, the oxygen-containing region has a portion in which the ratio of the Cr concentration to the Cr content in the alloy composition of the magnetic particle (also referred to as a “bulk Cr ratio” in the present specification) is more than 1. When the bulk Cr ratio is more than 1 in almost the entire oxygen-containing region, the oxide film on the surface of the magnetic particle can be considered to be particularly uniform. The Cr concentration of the very surface of the magnetic particle may be apparently decreased due to the influence of a deposited organic substance.

In the depth profile, when a carbon-containing region in which the ratio of the C concentration to the O concentration (also referred to as the “C/O ratio” in the present specification) is 1 or more can be defined from the surface of the magnetic particle, it can be judged that an organic binding substance is appropriately deposited on the surface of the magnetic particle. A C/O ratio of 1 or more indicates the presence of carbon equal to or more than oxygen constituting the oxide film on the measurement surface. When the carbon-containing region has a thickness of more than 5 nm, an organic binding substance on the surface of the magnetic particle is excessive, and the decrease in initial permeability and the increase in iron loss Pcv become apparent. To more consistently prevent the decrease in initial permeability and the increase in iron loss Pcv, the thickness of the carbon-containing region may preferably be 4 nm or less, more preferably 3 nm or less, particularly preferably 2 nm or less.

In the depth profile of the powder magnetic core, the oxygen-containing region preferably has a portion (also referred to as a “Si-concentrated portion” in the present specification) in which the ratio of the Si concentration (unit: atomic percent) to the Si content (unit: atomic percent) in the alloy composition of the magnetic particle (also referred to as a “bulk Si ratio” in the present specification) is more than 1. In this case, the Fe-based Cr-containing amorphous alloy contains Si Like Cr, Si is concentrated on the surface of the magnetic particle and contributes to the formation of a uniform oxide film. Thus, when the oxygen-containing region in the depth profile has a portion with a bulk Si ratio of more than 1, the oxide film on the surface of the magnetic particle is expected to be more uniform.

In the depth profile of the magnetic particle in the powder magnetic core, a region in which the ratio of the C concentration to the C content (unit: atomic percent) in the alloy composition of the magnetic particle (also referred to as a “bulk C ratio” in the present specification) is more than 1 can preferably be defined from the surface of the magnetic particle. This region is defined herein as a “carbon-concentrated region”. The carbon-concentrated region preferably has a depth of 2 nm or less from the surface of the magnetic particle. When the carbon-concentrated region has a depth of 2 nm or less from the surface of the magnetic particle, the organic binding substance is not excessively deposited on the surface of the magnetic particle, and the decrease in initial permeability and the increase in iron loss Pcv in the powder magnetic core are more consistently prevented. Although the region with a bulk C ratio of 1 or more may be found in a region other than the region contiguous to the surface, such a region is not defined as the “carbon-concentrated region” in the present specification.

The Fe-based Cr-containing amorphous alloy constituting the magnetic particle in the powder magnetic core may be an Fe—P—C amorphous alloy containing P and C. The Fe—P—C amorphous alloy tends to have a glass transition point but is susceptible to oxidation. In this regard, the Fe-based alloy constituting the magnetic particle of the present invention contains Cr and in a preferred example further contains Si. Thus, a uniform oxide film is easily formed as a passivation film on the surface of the magnetic particle, and consequently oxidation is less likely to occur inside the magnetic particle.

Another aspect of present invention is a method for producing a powder magnetic core. The production method includes a mixing step of preparing a mixed powder containing a magnetic particle of an Fe-based Cr-containing amorphous alloy and an organic binder, a forming step of pressing the mixed powder to form a formed product, and a heat-treatment step including strain relief heat treatment of setting a temperature of an atmosphere at a strain relief temperature, which is a strain relief treatment temperature of the formed product, to relieve the strain of the formed product. The heat-treatment step includes a first heat treatment and a second heat treatment following the first heat treatment, the atmosphere in the first heat treatment is nonoxidizing until a first temperature is reached, the first temperature being equal to or higher than the thermal decomposition temperature of the organic binder and equal to or lower than the strain relief temperature, and the atmosphere in the second heat treatment in a temperature range including the first temperature is oxidizing.

The nonoxidizing atmosphere in the first heat treatment and the oxidizing atmosphere in the second heat treatment following the first heat treatment form a uniform and thin passivation film as the oxide film on the surface of the magnetic particle. Furthermore, the thickness of the organic binding substance deposited on the surface of the magnetic particle is not excessive. Thus, the distance between adjacent magnetic particles can be decreased while ensuring insulation between the magnetic particles. Consequently, the powder magnetic core containing the magnetic particles has good magnetic characteristics. More specifically, the powder magnetic core is less likely to have decreased initial permeability and increased iron loss Pcv.

In the production method, the atmosphere in the first heat treatment may preferably be nonoxidizing while heating to the first temperature. More specifically, the heat-treatment step can be simplified by placing a formed product at a room temperature level in a heating means, such as a furnace, making the atmosphere nonoxidizing while the formed product is placed, and heating the formed product to the first temperature.

In the production method, the atmosphere may preferably be nonoxidizing while cooling from the strain relief temperature. Even while cooling from the strain relief temperature, an oxidizing atmosphere may cause oxidation of the magnetic particle. Thus, when the oxide film is appropriately formed in the second heat treatment, the nonoxidizing atmosphere while cooling can maintain the state of the appropriately formed oxide film.

In the production method, the first temperature may be a strain relief temperature. In such a case, the strain relief heat treatment, the first heat treatment, and the second heat treatment can be performed by simple temperature control of heating to the first temperature (strain relief temperature), holding the first temperature for a predetermined time, and then decreasing the temperature.

In the production method, the first temperature may be different from the strain relief temperature. A specific example of such a case includes the first heat treatment to the first temperature in the nonoxidizing atmosphere, the second heat treatment in the oxidizing atmosphere in the temperature range including the first temperature, and then the strain relief heat treatment in which the temperature of the atmosphere is changed to the strain relief temperature and in which the atmosphere at the strain relief temperature is nonoxidizing. Even when the optimum temperature to form a uniform and thin oxide film as a pas sivation film on the surface of the magnetic particle is different from the optimum temperature to relieve the strain of the magnetic particle, the temperature and atmosphere can be controlled in this manner to appropriately relieve the strain of the magnetic particle while forming an appropriate oxide film.

DESCRIPTION OF THE PREFERRED EMBODIMENTS

Figure 1:
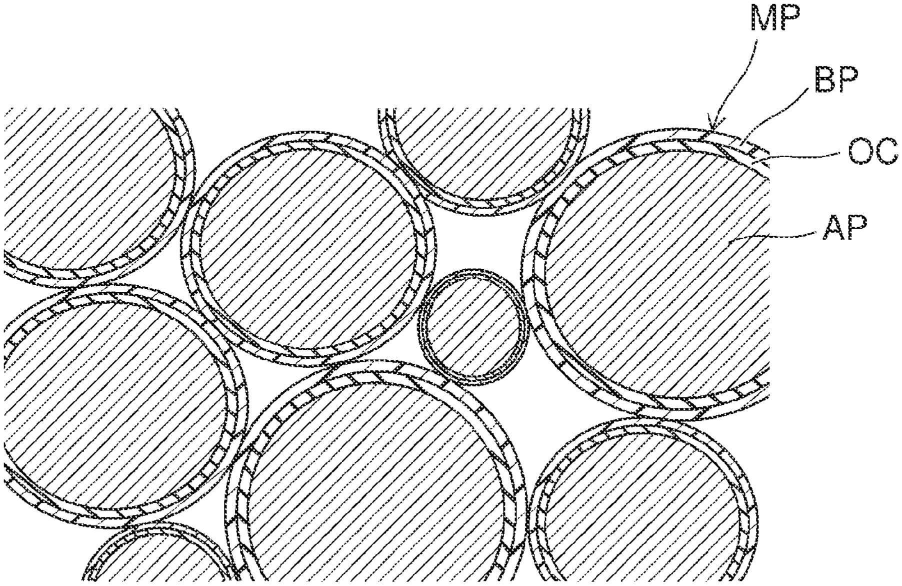
FIG. 1 is a schematic view of the structure of a magnetic particle in a powder magnetic core according to an embodiment of the present invention.

Embodiments of the present invention are described in detail below.

A powder magnetic core according to an embodiment of the present invention contains a magnetic particle of an Fe-based Cr-containing amorphous alloy. The "Fe-based Cr-containing amorphous alloy", as used herein, refers to an amorphous alloy with an Fe content of 50 atomic percent or more and an alloy material containing Cr as at least one additive element.

The "amorphous", as used herein, means that a diffraction spectrum with a peak clear enough to specify the material type cannot be obtained by typical X-ray diffractometry. Specific examples of the amorphous alloy include Fe—Si—B alloys, Fe—P—C alloys, and Co—Fe—Si—B alloys. Amorphous magnetic materials typically contain a magnetic element and an amorphizing element that promotes amorphization. The amorphizing element in Fe-based alloys may be a non-metallic or metalloid element, such as Si, B, P, or C. A metal element, such as Ti or Nb, may also contribute to amorphization. The Fe-based Cr-containing amorphous alloy may be composed of one material or a plurality of materials. The Fe-based Cr-containing amorphous alloy is preferably one or two or more materials selected from the group consisting of the above materials, preferably contains an Fe—P—C alloy among them, and is more preferably composed of an Fe—P—C alloy. The alloy composition is described below by way of example where the Fe-based Cr-containing amorphous alloy is an Fe—P—C alloy containing P and C.

Specific examples of the Fe—P—C alloy include Fe-based amorphous alloys represented by the composition formula $Fe_{100\ atomic\ percent\ a-b-c-x-y-z-t}Ni_aSn_bCr_cP_xC_yB_zSi_t$, wherein 0 atomic percent≤a≤10 atomic percent, 0 atomic percent≤b≤3 atomic percent, 0 atomic percent≤c≤6 atomic percent, 0 atomic percent≤x≤13 atomic percent, 0 atomic percent≤y≤13 atomic percent, 0 atomic percent≤z≤9 atomic percent, and 0 atomic percent≤t≤7 atomic percent. In the composition formula, Ni, Sn, Cr, B, and Si are optional additive elements.

The addition amount a of Ni preferably ranges from 0 to 6 atomic percent, more preferably 0 to 4 atomic percent. The addition amount b of Sn preferably ranges from 0 to 2 atomic percent and may range from 1 to 2 atomic percent. The addition amount c of Cr is preferably more than 0 atomic percent and 2 atomic percent or less, more preferably 1 to 2 atomic percent. The addition amount x of P is preferably 6.8 atomic percent or more and may preferably be 8.8 atomic percent or more. The addition amount y of C is preferably 2.2 atomic percent or more and may more preferably range from 5.8 to 8.8 atomic percent. The addition amount z of B preferably ranges from 0 to 3 atomic percent, more preferably 0 to 2 atomic percent. The addition amount t of Si preferably ranges from 0 to 6 atomic percent, more preferably 0 to 2 atomic percent. In such a case, the Fe content is preferably 70 atomic percent or more, preferably 75 atomic percent or more, more preferably 78 atomic percent or more, still more preferably 80 atomic percent or more, particularly preferably 81 atomic percent or more.

The Fe-based Cr-containing amorphous alloy may contain, in addition to these elements, one or two or more optional elements selected from the group consisting of Co, Ti, Zr, Hf, V, Nb, Ta, Mo, W, Mn, Re, platinum group elements, Au, Ag, Cu, Zn, In, As, Sb, Bi, S, Y, N, O, and rare-earth elements. The Fe-based Cr-containing amorphous alloy may contain incidental impurities, in addition to these elements.

FIG. 1 is a schematic view of the structure of a magnetic particle in a powder magnetic core according to an embodiment of the present invention. As illustrated in FIG. 1, in a magnetic particle MP according to the present embodiment, an oxide film OC is formed on the surface of an alloy portion AP formed of an Fe-based Cr-containing amorphous alloy, and an organic binding substance (binder BP) is deposited on the surface of the magnetic particle MP. Probably due to Cr in the Fe-based Cr-containing amorphous alloy constituting the magnetic particle MP, the oxide film OC on the surface of the magnetic particle MP is uniform, thin, and stable, and is a passivation film. Thus, even when the magnetic particles MP are adjacent to each other in the powder magnetic core, the oxide film OC can maintain the insulation state of the magnetic particles MP.

In a powder magnetic core according to an embodiment of the present invention, when the first heat treatment described later is performed in the production method, an element, such as Cr, in the amorphous alloy is concentrated on the surface and forms a passivation film. Furthermore, the second heat treatment, which introduces oxygen, forms a uniform oxide film as a passivation film on the surface of the magnetic particle. This reduces the increase in the iron loss Pcv of the powder magnetic core and can reduce the increase in iron loss Pcv even when the powder magnetic core is placed in a high-temperature environment. Furthermore, the organic binding substance deposited on the surface of the magnetic particle can maintain the shape of the powder magnetic core, which is an aggregate of the magnetic particles. Furthermore, due to an appropriate amount of organic binding substance deposited on the surface of the magnetic particle, the distance between adjacent magnetic particles is not excessive. This suppresses the decrease in the initial permeability of the powder magnetic core and the increase in iron loss Pcv.

To appropriately have a function of binding the magnetic particles, the organic binding substance of the magnetic particle is preferably a component based on a polymeric material. Examples of such a polymeric material (resin) include poly(vinyl alcohol) (PVA), acrylic resins, silicone resins, polypropylene, chlorinated polyethylene, polyethylene, ethylene-propylene-diene terpolymers (EPDM), chloroprene, polyurethane, poly(vinyl chloride), saturated polyesters, nitrile resins, epoxy resins, phenolic resins, urea resins, and melamine resins. When treatment including heating is not performed in a process of producing a powder magnetic core, such a polymeric material is expected to partly remain in the powder magnetic core and function as an organic binding substance. On the other hand, when treatment including heating is performed in a process of producing a powder magnetic core as described later, the polymeric material is modified or decomposed by heat, becomes a component based on the polymeric material, and remains in the powder magnetic core. At least part of the component based on the polymeric material may also function as an organic binding substance.

The degree of the formation of the oxide film in the magnetic particle contained in the powder magnetic core and the degree of the organic binding substance deposited on the surface of the magnetic particle can be quantitatively evaluated from the depth profile, as described below. In the present specification, the depth profile means a result obtained by measuring the depth dependency of the composition from the surface of the magnetic particle. The depth profile can be obtained by surface composition analysis with a surface analyzer, such as an Auger electron spectrometer, a photoelectron spectrometer, or a secondary ion mass spectrometer, in combination with a process of removing the measurement surface by sputtering or the like.

The depth profile of the magnetic particle in the powder magnetic core according to the present embodiment has the following characteristics.

An oxygen-containing region in which the ratio of the O concentration (unit: atomic percent) to the Fe concentration (unit: atomic percent) ("O/Fe ratio") is 0.1 or more can be defined from the surface of the magnetic particle, and the oxygen-containing region has a depth of 35 nm or less from the surface of the magnetic particle.

A carbon-containing region in which the ratio of the C concentration (unit: atomic percent) to the O concentration ("C/O ratio") is 1 or more can be defined from the surface of the magnetic particle, and the carbon-containing region has a depth of 5 nm or less from the surface of the magnetic particle.

The oxygen-containing region has a portion in which the ratio of the Cr concentration (unit: atomic percent) to the Cr content (unit: atomic percent) in the alloy composition of the magnetic particle ("bulk Cr ratio") is more than 1.

The O/Fe ratio is an indicator of the degree of oxidation of the magnetic particle at the corresponding depth. Although the O concentration in the depth profile also represents the degree of oxidation of the magnetic particle, the relative value with respect to another measured concentration is less susceptible to the influence of abnormal measurement than the evaluation of the O concentration itself, for example, due to the influence of a contaminant deposited during measurement. The magnetic particle is an Fe-based alloy, and therefore Fe is suitable for a reference element to obtain the relative value. Furthermore, oxidation of the magnetic particle decreases the Fe concentration, and therefore the O/Fe ratio is suitable for a parameter for evaluating the degree of oxidation.

An O/Fe ratio of 0.1 or more at the measurement depth can indicate the oxidation of Fe at the measurement surface. Thus, a region with an O/Fe ratio of 0.1 or more in the depth profile can be defined as an oxygen-containing region. When the oxygen-containing region can be defined, the magnetic particle may be oxidized, and an oxide film may be formed. The oxide film formed on the surface of the magnetic particle can function as an insulating layer between contiguous magnetic particles. Thus, when the oxygen-containing region can be defined from the surface of the magnetic particle, the magnetic particle can have an appropriate insulating layer on its surface. Consequently, the powder magnetic core containing the magnetic particle has good magnetic characteristics and in particular has a decreased iron loss Pcv.

The resolution of the depth of the depth profile depends on the measurement conditions and the sputtering conditions. In measurement with an Auger electron spectrometer, the resolution is approximately 1 nm at a sputtering rate of approximately 1 nm/min in terms of Si. Thus, the lower limit of the depth (sometimes referred to as the "thickness" in the present specification) from the surface of the magnetic particle in the oxygen-containing region can be approximately 1 nm. When the thickness of the oxygen-containing region of the magnetic particle is more than 35 nm, the uniformity of the oxide film formed as a passivation film on the surface of the magnetic particle tends to decrease. This decreases the degree of insulation of each magnetic particle and relatively increases the iron loss Pcv. To consistently prevent the increase in iron loss Pcv, the thickness of the oxygen-containing region in the magnetic particle may preferably be 30 nm or less, more preferably 25 nm or less. To more consistently ensure that the oxide film functions as an insulating film, the lower limit of the thickness of the oxygen-containing region of the magnetic particle is preferably 5 nm or more.

The magnetic particle in the powder magnetic core according to the present embodiment is formed of an Fe-based Cr-containing amorphous alloy, and Cr in the alloy is concentrated in an oxide film on the surface of the magnetic particle and contributes to the formation of a uniform oxide film as a passivation film. More specifically, the oxygen-containing region has a portion in which the ratio of the Cr concentration to the Cr content in the alloy composition of the magnetic particle ("bulk Cr ratio") is more than 1. When the bulk Cr ratio is more than 1 in almost the entire oxygen-containing region, the oxide film on the surface of the magnetic particle can be considered to be particularly uniform. The Cr concentration of the very surface of the magnetic particle may be apparently decreased due to the influence of a deposited organic substance.

In the depth profile, when a carbon-containing region in which the ratio of the C concentration to the O concentration ("C/O ratio") is 1 or more can be defined from the surface of the magnetic particle, it can be judged that an organic binding substance is appropriately deposited on the surface of the magnetic particle. The organic binding substance appropriately deposited on the surface of the magnetic particle can fix the magnetic particles constituting the powder magnetic core and enables the powder magnetic core to maintain its shape. The organic binding substance, which is an essential component of the powder magnetic core as well as the magnetic particle, is produced by heating an organic binder mixed as a binding material. More specifically, when the organic binder contains an organic resin component, the organic binding substance contains a thermally modified substance of the organic resin component. As described later, the first heat treatment of heating the formed product containing the organic binder in the nonoxidizing atmosphere can appropriately determine the amount of organic binding substance in the powder magnetic core.

The C concentration in the depth profile is influenced by the amount of organic binding substance deposited on the surface of the magnetic particle. Thus, information on the degree of deposition of the organic binding substance on the surface of the magnetic particle can be obtained from the C concentration. However, C is a relatively less quantitative element in the depth profile. Thus, evaluation of the amount of carbon based on the amount of oxygen constituting the oxide film on the measurement surface, more specifically, evaluation based on the C/O ratio, rather than evaluation based on the C concentration, enables the amount of organic binding substance on the measurement surface to be quantitatively evaluated. A C/O ratio of 1 or more indicates the presence of carbon equal to or more than oxygen constituting the oxide film on the measurement surface.

Thus, the presence of the carbon-containing region is essential for maintaining the shape of the powder magnetic core. An excessively large thickness of the carbon-containing region, however, results in a large distance between adjacent powder magnetic cores, which decreases the initial permeability. Furthermore, as described above, the organic binding substance contains a thermally modified substance of the organic binder present around the magnetic particle during the forming process. Thus, when the organic binding substance is produced from the organic binder, a volume change may occur and cause a strain in the powder magnetic core. If applied to the magnetic particle, the strain increases the iron loss Pcv in the powder magnetic core. Thus, the thickness of the carbon-containing region defined by the depth profile preferably does not exceed some upper limit. More specifically, when the carbon-containing region has a thickness of more than 5 nm, the organic binding substance on the surface of the magnetic particle is excessive, and the decrease in initial permeability and the increase in iron loss Pcv become apparent. To more consistently prevent the decrease in initial permeability and the increase in iron loss Pcv, the thickness of the carbon-containing region may preferably be 4 nm or less, more preferably 3 nm or less, particularly preferably 2 nm or less. The lower limit of the thickness of the carbon-containing region is 1 nm due to the resolution of the depth profile.

In the depth profile of the powder magnetic core, the oxygen-containing region preferably has a portion in which the ratio of the Si concentration (unit: atomic percent) to the Si content (unit: atomic percent) in the alloy composition of the magnetic particle ("bulk Si ratio") is more than 1. In this case, the Fe-based Cr-containing amorphous alloy contains Si. Like Cr, Si is concentrated on the surface of the magnetic particle and contributes to the formation of a uniform oxide film as a passivation film. Thus, when the oxygen-containing region in the depth profile has a portion with a bulk Si ratio of more than 1, the oxide film on the surface of the magnetic particle is expected to be a more uniform passivation film.

In the depth profile of the magnetic particle in the powder magnetic core according to the present embodiment, preferably, a carbon-concentrated region in which the ratio of the C concentration to the C content (unit: atomic percent) in the alloy composition of the magnetic particle (bulk C ratio) is more than 1 can be defined from the surface of the magnetic particle, and the carbon-concentrated region has a depth of 2 nm or less from the surface of the magnetic particle. For an Fe-based Cr-containing amorphous alloy containing C, such as an Fe—P—C amorphous alloy, a peak derived from carbon as an alloy component is detected even when the C content in the alloy composition is sufficiently large in depth from the surface in the depth profile. Thus, for an Fe-based Cr-containing amorphous alloy containing C, evaluation of the C concentration based on the C content in the alloy composition facilitates the evaluation of the effects of carbon derived from the organic binding substance. More specifically, when a carbon-concentrated region with a bulk C ratio of more than 1 can be defined from the surface of the magnetic particle, it can be confirmed that the organic binding substance is deposited on the magnetic particle. When the carbon-concentrated region has a depth of 2 nm or less from the surface of the magnetic particle, the organic binding substance is not excessively deposited on the surface of the magnetic particle, and the decrease in initial permeability and the increase in iron loss Pcv in the powder magnetic core are more consistently prevented.

As described above, the Fe-based Cr-containing amorphous alloy constituting the magnetic particle in the powder magnetic core according to the present embodiment is an Fe—P—C amorphous alloy containing P and C. The Fe—P—C amorphous alloy tends to have a glass transition point but is susceptible to oxidation. In this regard, the Fe-based alloy constituting the magnetic particle of the present invention contains Cr and in a preferred example further contains Si. Thus, an oxide film is easily formed as a uniform passivation film on the surface of the magnetic particle, and consequently oxidation is less likely to occur inside the magnetic particle.

A powder magnetic core according to an embodiment of the present invention may be produced by any method, as long as it has the above structure. A powder magnetic core according to an embodiment of the present invention can be reproducibly and efficiently produced by a production method described below.

A method for producing a powder magnetic core according to an embodiment of the present invention includes a powder forming step, a mixing step, a forming step, and a heat-treatment step described below.

In the powder forming step, a magnetic particle is formed from a melt of an Fe-based Cr-containing amorphous alloy. The magnetic particle may be formed by any method. Examples include rapid quenching methods, such as a single-roll method and a twin-roll method, and atomization methods, such as gas atomization method and water atomization method. Although the quenching methods can easily produce an amorphous alloy due to its relatively high cooling rate, a ribbon grinding operation is required to form magnetic particles. The atomization methods include shape formation while cooling, and therefore it is possible to simplify the process. The magnetic particle formed by cooling the melt and, if necessary, by grinding may be classified.

In the mixing step, a mixed powder containing the magnetic particle formed in the powder forming step and an organic binder is prepared. The organic binder may be a polymeric material (resin). Specific examples of the polymeric material are described above. The organic binder may be composed of one type of material or a plurality of types of materials. The organic binder may be classified as required. The organic binder and the magnetic particle may be mixed by a known method.

The mixed powder may contain an inorganic component. Specific examples of the inorganic component include glass powders. The mixed powder may further contain a lubricant, a coupling agent, an insulating filler, such as silica, and/or a flame retardant.

The lubricant, if present, may be of any type. The lubricant may be an organic lubricant or an inorganic lubricant. Specific examples of the organic lubricant include hydrocarbon materials, such as liquid paraffins, metallic soap materials, such as zinc stearate and aluminum stearate, and aliphatic amide materials, such as fatty acid amides and alkylene fatty acid amides. Such an organic lubricant vaporizes in a heat-treatment step described later and remains little in the powder magnetic core.

The mixed powder may be prepared from the above components by any method. An appropriate dilution medium, such as water or xylene, and each component are mixed to form a slurry, which is then stirred in a planetary mixer or a mortar to form a homogeneous mixture, which is then dried. The drying conditions in this case are not limited. For example, drying is performed by heating in an inert atmosphere, such as nitrogen or argon, in the range of approximately 80° C. to 170° C.

The amount of each component in the mixed powder is appropriately determined in consideration of the forming step described later and the magnetic characteristics of the powder magnetic core. A non-limiting example of the composition of the mixed powder contains 0.4 to 2.0 parts by mass of an organic binder composed of a polymeric material powder and 0 to 2.0 parts by mass of an inorganic component per 100 parts by mass of the magnetic particle.

In the forming step, the mixed powder prepared in the mixing step is pressed to form a formed product. The press forming conditions are appropriately determined in consideration of the composition of the mixed powder, the conditions of the heat-treatment step described later, and the characteristics of the powder magnetic core finally produced. A non-limiting example of the press forming is performed at normal temperature (25° C.) in the pressure range of approximately 0.4 to 3 GPa.

The heat-treatment step includes strain relief heat treatment of setting the temperature of the atmosphere at the strain relief temperature, which is the strain relief treatment temperature of the formed product formed in the forming step, to relieve the strain of the formed product. The formed product receives a pressure in the range of sub-GPa to GPa in the forming step and has strain remained inside. The strain impairs the magnetic characteristics and particularly increases the iron loss Pcv. Thus, the temperature of the atmosphere of the formed product is set at the strain relief temperature to relieve the strain of the formed product. The temperature of the atmosphere may be set at the strain relief temperature by any method. The formed product may be placed in a furnace, and the atmosphere in the furnace may be heated. Alternatively, the formed product may be directly heated by induction heating to heat the atmosphere of the formed product.

The strain relief temperature is determined such that the powder magnetic core after the heat treatment has the best magnetic characteristics. A non-limiting example of the strain relief temperature ranges from 300° C. to 500° C. The evaluation criteria for the magnetic characteristics of the powder magnetic core are not particularly limited when the strain relief temperature as well as the holding time of the strain relief temperature, the heating rate, and the cooling rate are determined. A specific example of the evaluation item is the iron loss Pcv of the powder magnetic core. In such a case, the heating temperature of the formed product is determined such that the iron loss Pcv of the powder magnetic core is minimized. The conditions for measuring the iron loss Pcv are appropriately determined. For example, the frequency is 2 MHz, and the effective maximum magnetic flux density Bm is 15 mT.

As described later, the atmosphere in the strain relief heat treatment may be nonoxidizing or oxidizing.

The heat-treatment step in a production method according to the present embodiment includes a first heat treatment and a second heat treatment following the first heat treatment. The atmosphere in the first heat treatment is nonoxidizing until a first temperature is reached, the first temperature being equal to or higher than the thermal decomposition temperature of the organic binder and equal to or lower than the strain relief temperature. The nonoxidizing atmosphere in the first heat treatment suppresses the formation of an oxide film in the magnetic particle. On the other hand, although the temperature reaches the thermal decomposition temperature of the organic binder or higher, the thermal decomposition of the organic binder is insufficient due to the nonoxidizing atmosphere. In this state, the stress from the organic binder acts on the magnetic particle, and the magnetic characteristics of the magnetic particle cannot be sufficiently exhibited. Thus, the second heat treatment described later adjusts the C concentration of the residual organic binder and reduces the stress from the organic binder as much as possible.

Specific examples of the nonoxidizing atmosphere include a nitrogen atmosphere and an argon atmosphere. The thermal decomposition temperature of the organic binder is appropriately determined according to the composition of the organic binder, and the first temperature may be higher by several tens of degrees than the thermal decomposition temperature. A non-limiting example of the first temperature ranges from 250° C. to 450° C. The first heat treatment may include a cooling process to the first temperature. To improve productivity, however, the first heat treatment is preferably a heating process of heating the atmosphere in a low-temperature state, such as at room temperature, to the first temperature. In the heating process to the first temperature, the first heat treatment can be performed with high productivity in the nonoxidizing atmosphere.

The atmosphere in the second heat treatment in a temperature range including the first temperature is oxidizing. The oxidizing atmosphere in the second heat treatment promotes the decrease in the C concentration due to the thermal decomposition of the organic binder and the formation of an oxide film in the magnetic particle. At this time, because the temperature has reached the first temperature, a substance such as Cr or Si can move easily in the magnetic particle, and consequently an oxide film that is a uniform and stable thin passivation film is easily formed. Furthermore, when the atmosphere is an oxidizing atmosphere from a low-temperature state, such as room temperature, the magnetic particle is not sufficiently heated, and the time during which atoms move slowly inside the magnetic particle is long, and consequently a uniform and stable oxide film is rarely formed.

A specific example of the oxidizing atmosphere is a nonoxidizing atmosphere to which oxygen is supplied such that the concentration in the atmosphere ranges from 0.1% to 20% by volume. The concentration of oxygen in the oxidizing atmosphere preferably ranges from 1% to 5% by volume to enhance the controllability in the formation of the oxide film. The temperature range including the first temperature in the second heat treatment is preferably controlled within approximately ±10° C. around the first temperature to stably form the oxide film and the organic binding substance.

In the heat-treatment step, the first temperature may be a strain relief temperature. In such a case, the strain relief heat treatment, the first heat treatment, and the second heat treatment can be performed by the simplest temperature control of heating to the first temperature (strain relief temperature), holding the first temperature for a predetermined time, and then decreasing the temperature.

In the heat-treatment step, the first temperature may be different from the strain relief temperature. A specific example of such a case includes the first heat treatment to the first temperature in the nonoxidizing atmosphere, the second heat treatment in the oxidizing atmosphere in the temperature range including the first temperature, and then the strain relief heat treatment in which the temperature of the atmosphere is changed to the strain relief temperature and in which the atmosphere at the strain relief temperature is nonoxidizing. Even when the optimum temperature to form a uniform and thin oxide film on the surface of the magnetic particle is different from the optimum temperature to relieve the strain of the magnetic particle, the temperature and atmosphere can be controlled in this manner to appropriately relieve the strain of the magnetic particle while forming an appropriate oxide film.

In the heat-treatment step, the atmosphere may preferably be nonoxidizing while cooling from the strain relief temperature. Even while cooling from the strain relief temperature, an oxidizing atmosphere may cause oxidation of the magnetic particle and oxidative decomposition of the organic binding substance. Thus, when the oxide film is appropriately formed in the second heat treatment, the nonoxidizing atmosphere while cooling can maintain the state of the appropriately formed oxide film. The cooling step may function as part of the strain relief heat treatment.

A powder magnetic core produced by a method for producing a powder magnetic core according to an embodiment of the present invention may have any shape.

Figure 2:
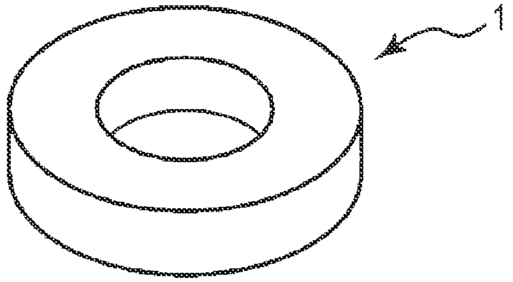
FIG. 2 is a schematic perspective view of the shape of a powder magnetic core according to an embodiment of the present invention.

FIG. 2 illustrates a toroidal core 1 as an example of a powder magnetic core produced by a method for producing a powder magnetic core according to an embodiment of the present invention. The toroidal core 1 has a ring shape in appearance. The toroidal core 1, which is formed of a powder magnetic core according to an embodiment of the present invention, has good magnetic characteristics.

An electronic component according to an embodiment of the present invention includes a powder magnetic core produced by a method for producing a powder magnetic core according to an embodiment of the present invention, a coil, and a connection terminal coupled to each end of the coil. At least part of the powder magnetic core is arranged to be located in an induction magnetic field generated by an electric current flowing through the coil via the connection terminal.

Figure 3:
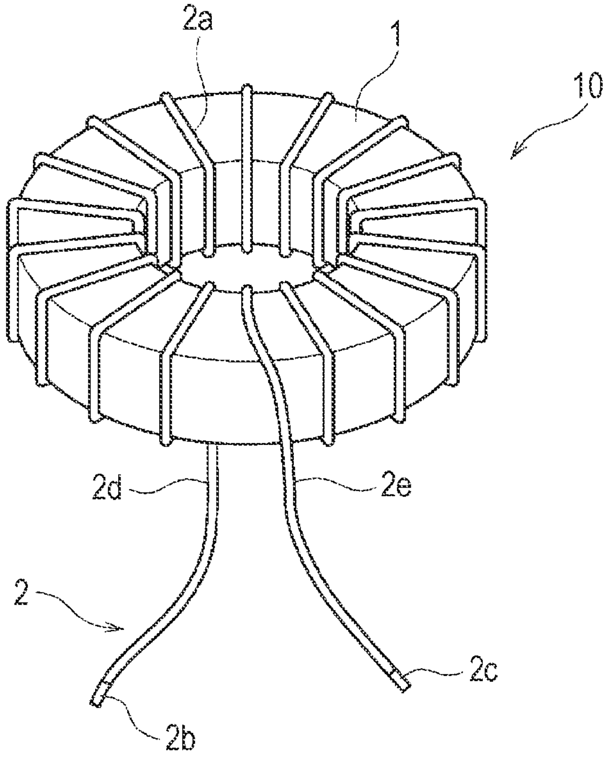
FIG. 3 is a schematic perspective view of the shape of a toroidal coil that is an electronic component including a powder magnetic core according to an embodiment of the present invention.

An example of such an electronic component is a toroidal coil 10 illustrated in FIG. 3. The toroidal coil 10 includes a coil 2*a* formed by winding a coated conductive wire 2 around the toroidal core 1, which is a ring-shaped powder magnetic core. End portions 2*d* and 2*e* of the coil 2*a* can be defined in a portion of the conductive wire located between the coil 2*a* formed of the wound coated conductive wire 2 and end portions 2*b* and 2*c* of the coated conductive wire 2. Thus, in the electronic component according to the present embodiment, the coil and the connection terminal may be composed of the same member.

Figure 4:
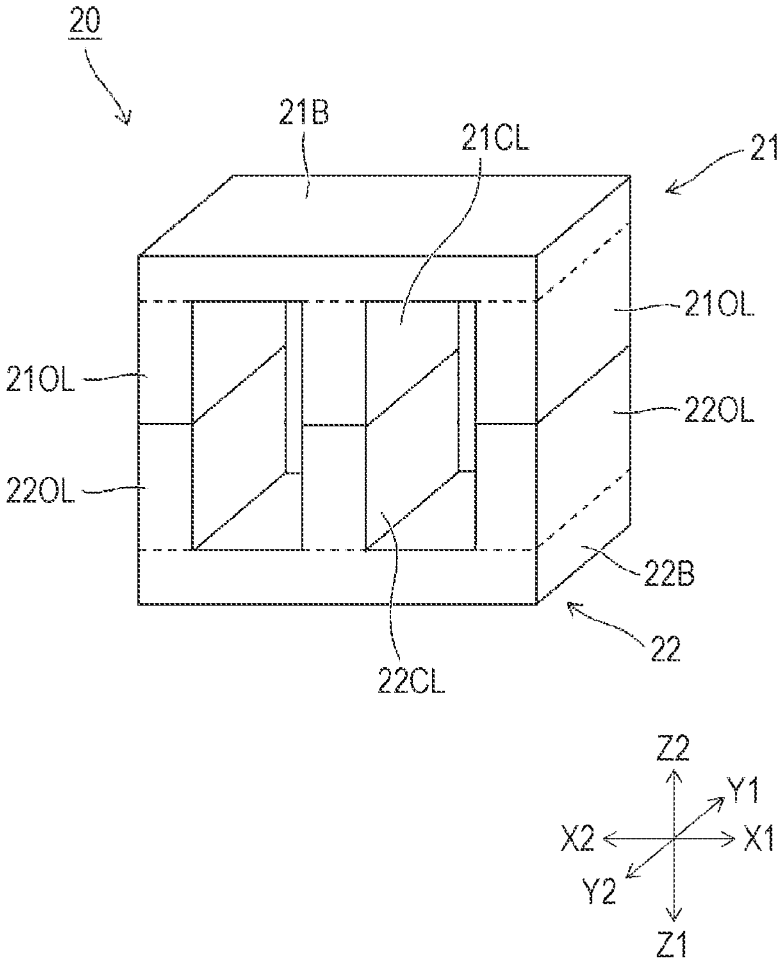
FIG. 4 is a schematic view of an EE core including a powder magnetic core according to another embodiment of the present invention.
Figure 5:
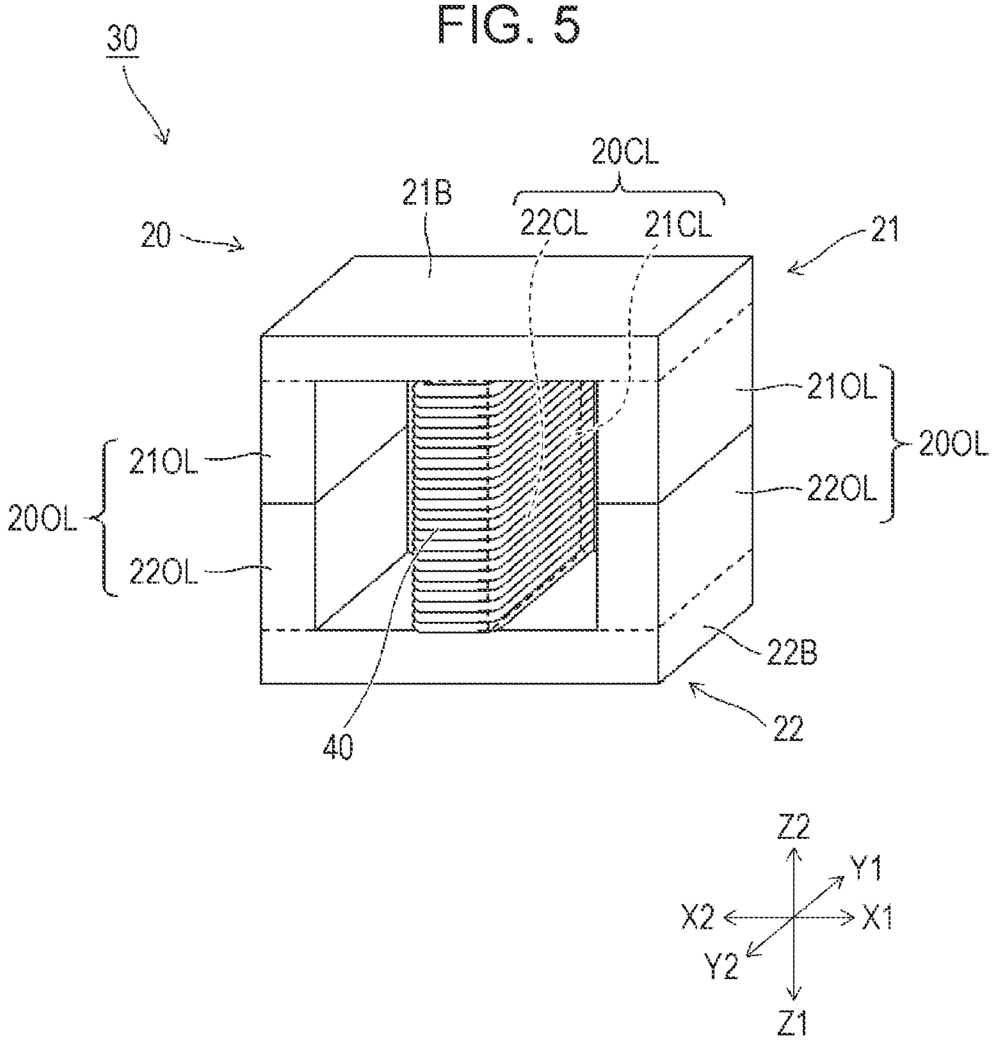
FIG. 5 is a schematic view of an inductance element including the EE core illustrated in FIG. 4 and a coil.

Another example of an electronic component according to an embodiment of the present invention includes a powder magnetic core with a shape different from the toroidal core 1. A specific example of such an electronic component is an inductance element 30 illustrated in FIG. 5. FIG. 4 is a schematic view of an EE core including a powder magnetic core according to another embodiment of the present invention. FIG. 5 illustrates an inductance element including the EE core illustrated in FIG. 4 and a coil.

An EE core 20 illustrated in FIG. 4 includes two E cores 21 and 22 oppositely arranged in the Z1-Z2 direction. The two E cores 21 and 22 have the same shape and are composed of bottoms 21B and 22B, central legs 21CL and 22CL, and two outer legs 210L and 220L. The EE core 20 is a member with an Fe-based alloy composition according to an embodiment of the present invention and is more specifically composed of a green compact (the two E cores 21 and 22). Thus, the EE core 20 has good magnetic characteristics.

As illustrated in FIG. 5, the inductance element 30 includes a coil 40 around a central leg 20CL of the EE core 20. When the coil 40 is energized, a magnetic path is formed from the central leg 20CL to an outer leg 200L through the bottom 21B or the bottom 22B and returns to the central leg 20CL through the bottom 22B or the bottom 21B. The number of turns of the coil 40 is appropriately determined according to the required inductance.

An electrical/electronic device according to an embodiment of the present invention includes an electrical/electronic component including a powder magnetic core according to an embodiment of the present invention. Examples of such an electrical/electronic device include power supplies and small portable communication devices including a power switching circuit, a voltage increasing/decreasing circuit, and/or a smoothing circuit.

These embodiments are described to facilitate the understanding of the present invention and do not limit the present invention. Thus, the components disclosed in the embodiments encompass all design changes and equivalents thereof that fall within the technical scope of the present invention.

EXAMPLES

Although the present invention is more specifically described in the following examples, the scope of the present invention is not limited to these examples.

Comparative Example 1

An Fe-based alloy composition with the following composition was prepared by melting, and a soft magnetic material (magnetic particles) composed of a powder was formed by a gas atomization method.

Fe: 77.9 atomic percent
Cr: 1 atomic percent
P: 7.3 atomic percent
C: 2.2 atomic percent
B: 7.7 atomic percent
Si: 3.9 atomic percent
Other incidental impurities (Mixing Step)

The magnetic particle and other components listed below in Table 1 were mixed to prepare a slurry. The acrylic resin had a thermal decomposition temperature of approximately 360° C.

TABLE 1

| Component | Amount (mass %) |
|---|---|
| Magnetic particles | 97.8 |
| Acrylic resin | 1.4 |
| Phosphate glass | 0.4 |
| Zinc stearate | 0.3 |
| Silica | 0.1 |

The slurry was heated and dried at approximately 110° C. for 2 hours. The resulting bulk mixed powder was ground. The ground powder was classified through a sieve. Granules with a particle size in the range of 300 μm to 850 μm were collected to prepare a mixed powder of a granulated powder.

(Forming Step)

The mixed powder was placed in a mold cavity and was subjected to compaction forming at a forming pressure of 1.8 GPa. A formed product thus formed had a shape of a toroidal core (outer diameter: 20 mm, inner diameter: 12.75 mm, thickness: 6.8 mm) with the appearance illustrated in FIG. 2.

(Heat-Treatment Step)

Figure 6:
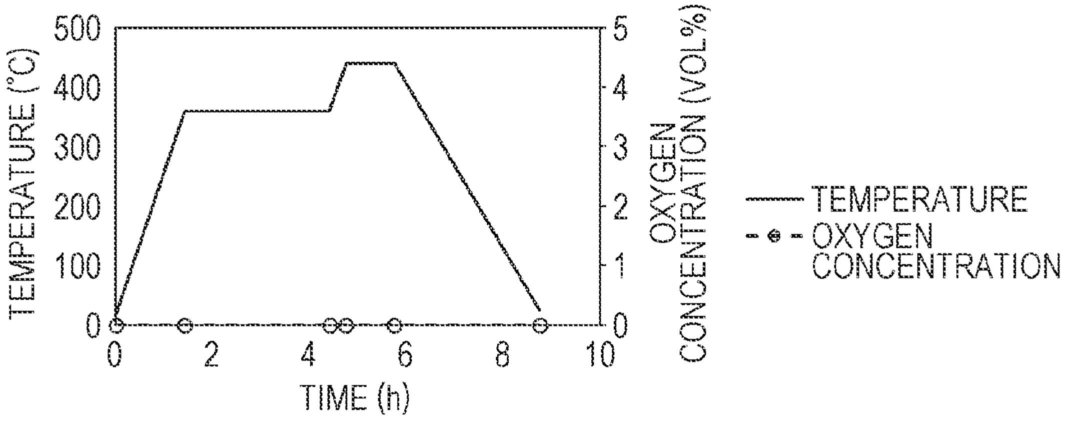
FIG. 6 is a profile of a heat-treatment step according to Comparative Example 1.

The formed product was placed in an inert gas oven. Nitrogen to be supplied to the furnace was mixed with the air to adjust the concentration of oxygen in the furnace atmosphere. The temperature and oxygen concentration of the atmosphere were controlled as shown in Table 2 and FIG. 6. FIG. 6 is a profile of a heat-treatment step according to Comparative Example 1. First, a first heat treatment was performed in which the furnace temperature was increased from 20° C. to a first temperature 360° C. over 85 minutes while the oxygen concentration was maintained at 0% by volume. The furnace temperature was then maintained at 360° C. for 3 hours while the oxygen concentration was maintained at 0% by volume. The furnace temperature was then increased to a strain relief temperature 440° C. over 20 minutes while the oxygen concentration was maintained at 0% by volume. The furnace temperature was held at 440° C. for 1 hour while the oxygen concentration was maintained at 0% by volume, and was then decreased to 25° C. over 3 hours while the oxygen concentration was maintained at 0% by volume. Thus, a powder magnetic core with a toroidal core shape was formed.

TABLE 2

| | Time (h) | Temperature (° C.) | Oxygen concentration (vol %) |
|---|---|---|---|
| Start of first heat treatment | 0 | 20 | 0 |
| Finish of first heat treatment | 1.42 | 360 | 0 |
| Start of heating | 4.42 | 360 | 0 |
| Start of strain relief heat treatment | 4.75 | 440 | 0 |
| Finish of strain relief heat treatment | 5.75 | 440 | 0 |
| Finish of cooling | 8.75 | 25 | 0 |

Example 1

Figure 7:
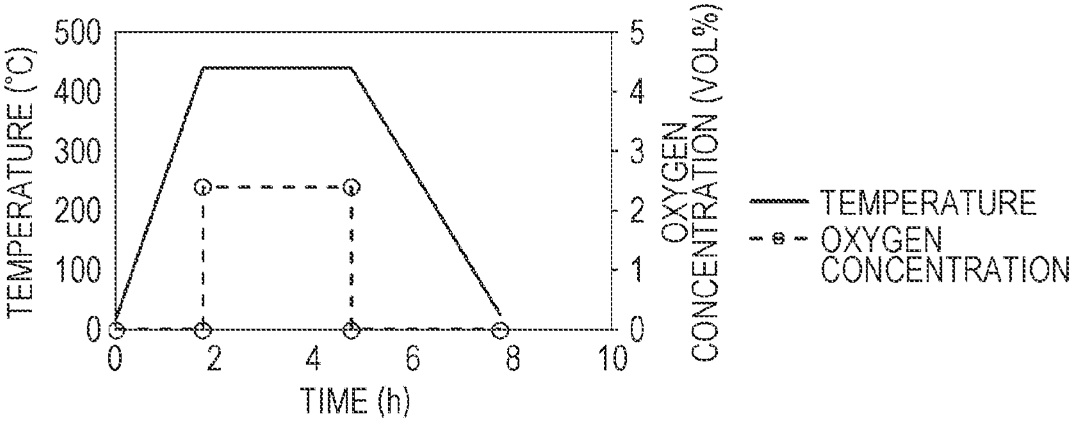
FIG. 7 is a profile of a heat-treatment step according to Example 1.

A product formed through the mixing step and the forming step of Comparative Example 1 was subjected to a heat-treatment step as shown in Table 3 and FIG. 7 in the equipment described in Comparative Example 1. FIG. 7 is the profile of the heat-treatment step according to Example 1.

TABLE 3

| | Time (h) | Temperature (° C.) | Oxygen concentration (vol %) |
|---|---|---|---|
| Start of first heat treatment | 0 | 20 | 0 |
| Finish of first heat treatment | 1.75 | 440 | 0 |
| Start of second heat treatment | 1.75 | 440 | 2.4 |
| Finish of second heat treatment | 4.75 | 440 | 2.4 |
| Start of cooling | 4.75 | 440 | 0 |
| Finish of cooling | 7.75 | 25 | 0 |

First, a first heat treatment was performed in which the furnace temperature was increased from 20° C. to a first temperature or a strain relief temperature 440° C. over 105 minutes while the oxygen concentration was maintained at 0% by volume. The oxygen concentration was then set at 2.4% by volume while the strain relief temperature 440° C. of the first heat treatment was maintained. At this oxygen concentration, the second heat treatment, that is, the strain relief heat treatment was performed in which the furnace temperature was maintained at 440° C. for 3 hours. The oxygen concentration was then set at 0% by volume, and the furnace temperature was decreased to 25° C. over 3 hours at this oxygen concentration.

Example 2

Figure 8:
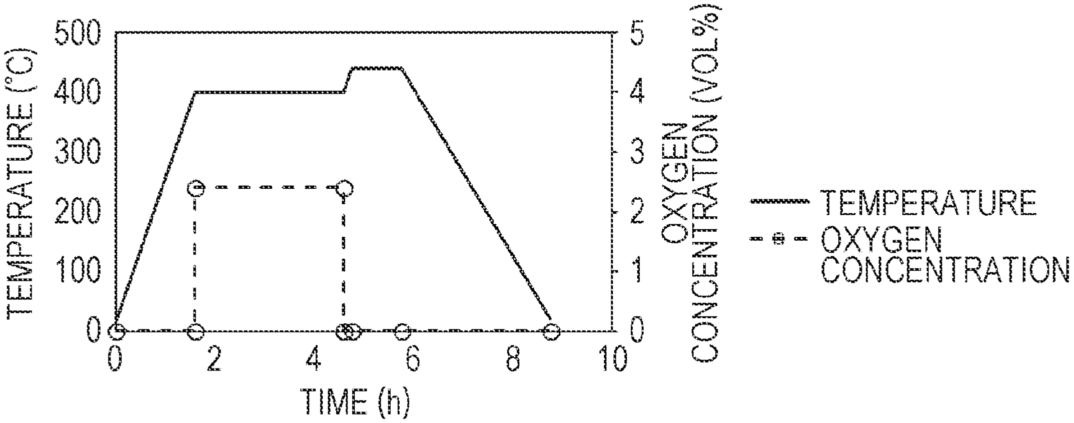
FIG. 8 is a profile of a heat-treatment step according to Example 2.

A product formed through the mixing step and the forming step of Example 1 was subjected to a heat-treatment step as shown in Table 4 and FIG. 8 in the equipment described in Example 1. FIG. 8 is the profile of the heat-treatment step according to Example 2.

TABLE 4

| | Time (h) | Temperature (° C.) | Oxygen concentration (vol %) |
|---|---|---|---|
| Start of first heat treatment | 0 | 20 | 0 |
| Finish of first heat treatment | 1.58 | 400 | 0 |
| Start of second heat treatment | 1.58 | 400 | 2.4 |
| Finish of second heat treatment | 4.58 | 400 | 2.4 |
| Start of heating | 4.58 | 400 | 0 |
| Start of strain relief treatment | 4.75 | 440 | 0 |
| Finish of strain relief treatment | 5.75 | 440 | 0 |
| Finish of cooling | 8.75 | 20 | 0 |

First, a first heat treatment was performed in which the furnace temperature was increased from 20° C. to a first temperature 400° C. over 95 minutes while the oxygen concentration was maintained at 0% by volume. The oxygen concentration was then set at 2.4% by volume while the first temperature 400° C. of the first heat treatment was maintained. At this oxygen concentration, the second heat treatment was performed in which the furnace temperature was maintained at 400° C. for 3 hours. The oxygen concentration was then set at 0% by volume, and the furnace temperature was increased to 440° C. in 10 minutes. The atmosphere with these oxygen concentration and temperature was maintained for 1 hour to perform strain relief heat treatment. The furnace temperature was then decreased to 20° C. over 3 hours while the oxygen concentration was maintained at 0% by volume.

Example 3

Figure 9:
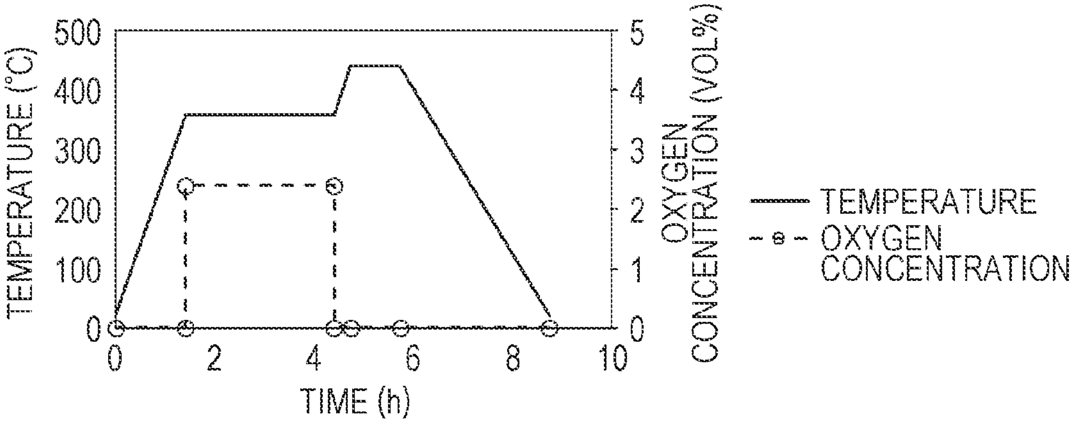
FIG. 9 is a profile of a heat-treatment step according to Example 3.

A product formed through the mixing step and the forming step of Example 1 was subjected to a heat-treatment step as shown in Table 5 and FIG. 9 in the equipment described in Example 1. FIG. 9 is the profile of the heat-treatment step according to Example 3.

TABLE 5

| | Time (h) | Temperature (° C.) | Oxygen concentration (vol %) |
|---|---|---|---|
| Start of first heat treatment | 0 | 20 | 0 |
| Finish of first heat treatment | 1.42 | 360 | 0 |
| Start of second heat treatment | 1.42 | 360 | 2.4 |
| Finish of second heat treatment | 4.42 | 360 | 2.4 |
| Start of heating | 4.42 | 360 | 0 |
| Start of strain relief treatment | 4.75 | 440 | 0 |
| Finish of strain relief treatment | 5.75 | 440 | 0 |
| Finish of cooling | 8.75 | 20 | 0 |

First, a first heat treatment was performed in which the furnace temperature was increased from 20° C. to a first temperature 360° C. over 85 minutes while the oxygen concentration was maintained at 0% by volume. The oxygen concentration was then set at 2.4% by volume while the first temperature 360° C. of the first heat treatment was maintained. At this oxygen concentration, the second heat treatment was performed in which the furnace temperature was maintained at 360° C. for 3 hours. The oxygen concentration was then set at 0% by volume, and the furnace temperature was increased to 440° C. in 20 minutes. The atmosphere with these oxygen concentration and temperature was maintained for 1 hour to perform strain relief heat treatment. The furnace temperature was then decreased to 20° C. over 3 hours while the oxygen concentration was maintained at 0% by volume.

Comparative Example 2

Figure 10:
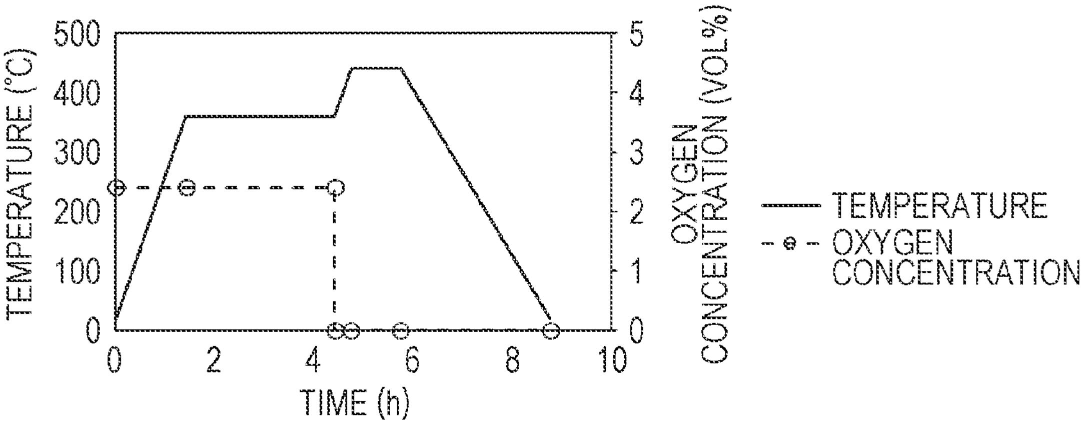
FIG. 10 is a profile of a heat-treatment step according to Comparative Example 2.

A product formed through the mixing step and the forming step of Example 1 was subjected to a heat-treatment step as shown in Table 6 and FIG. 10 in the equipment described in Example 1. FIG. 10 is the profile of the heat-treatment step according to Comparative Example 2.

TABLE 6

| | Time (h) | Temperature (° C.) | Oxygen concentration (vol %) |
|---|---|---|---|
| Start of heating | 0 | 20 | 2.4 |
| Finish of heating | 1.42 | 360 | 2.4 |
| Start of second heat treatment | 1.42 | 360 | 2.4 |
| Finish of second heat treatment | 4.42 | 360 | 2.4 |
| Start of heating | 4.42 | 360 | 0 |
| Start of strain relief treatment | 4.75 | 440 | 0 |
| Finish of strain relief treatment | 5.75 | 440 | 0 |
| Finish of cooling | 8.75 | 20 | 0 |

First, the furnace temperature was increased from 20° C. to a first temperature 360° C. over 85 minutes while the oxygen concentration was maintained at 2.4% by volume. A second heat treatment was then performed in which the furnace temperature was held at 360° C. for 3 hours while the oxygen concentration was maintained at 2.4% by volume. The oxygen concentration was then set at 0% by volume, and the furnace temperature was increased to 440° C. in 20 minutes. The oxygen concentration and temperature were maintained for 1 hour to perform strain relief heat treatment. The furnace temperature was then decreased to 20° C. over 3 hours while the oxygen concentration was maintained at 0% by volume.

(Test Example 1) Measurement of Depth Profile

The depth profile of the magnetic particle in the powder magnetic core formed in the examples and the comparative examples was measured by performing surface analysis while sputtering the measurement surface with argon using an Auger electron spectrometer ("JAMP-7830F" manufactured by JEOL Ltd.). The measurement region was a circle with a diameter of 1 μm. FIGS. 11 to 25 show the measurement results.

Figure 11:
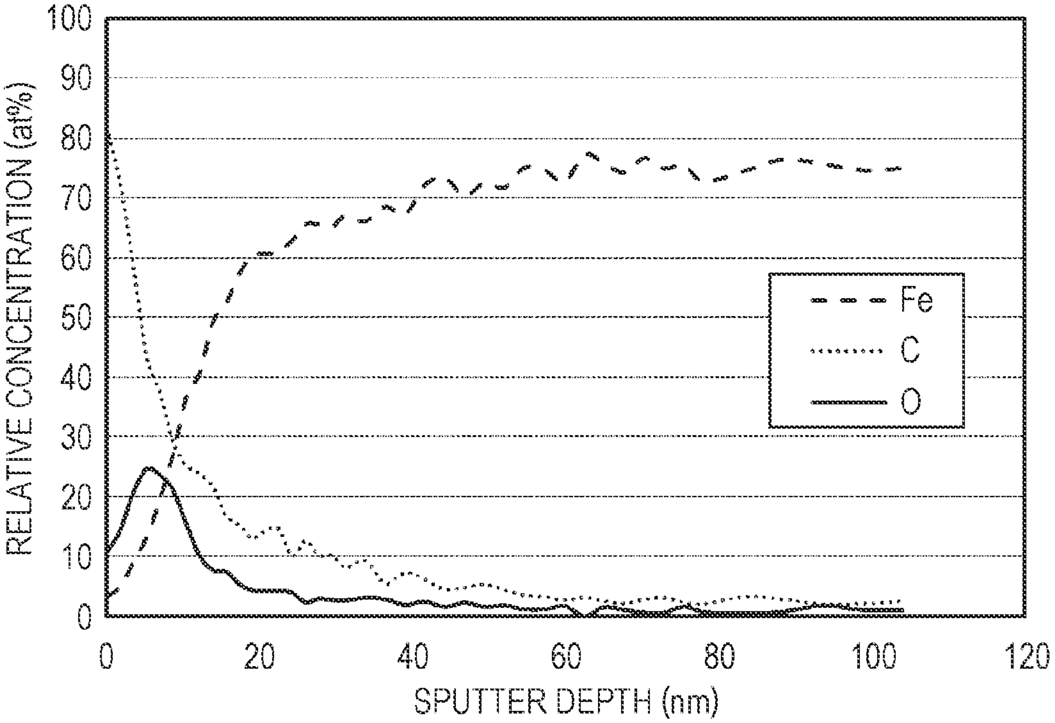
FIG. 11 is a graph of the depth profiles of the Fe, C, and O (oxygen) concentrations in a magnetic particle in a powder magnetic core according to Comparative Example 1.
Figure 12:
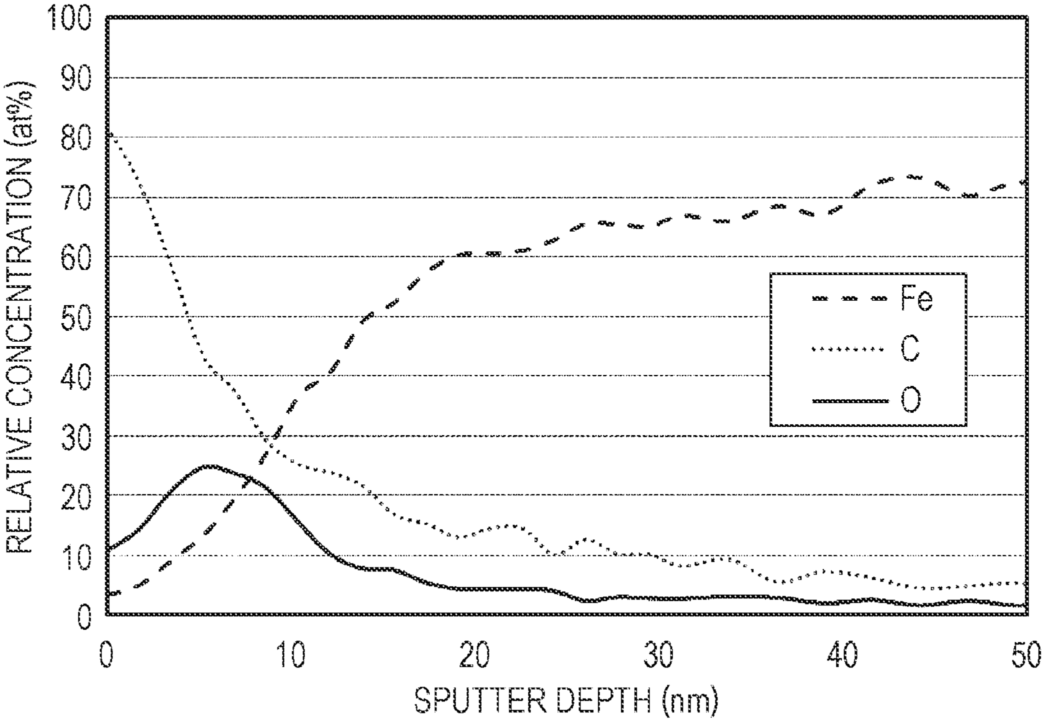
FIG. 12 is an enlarged graph of the depth profiles of FIG. 11 expanded along the horizontal axis.
Figure 13:
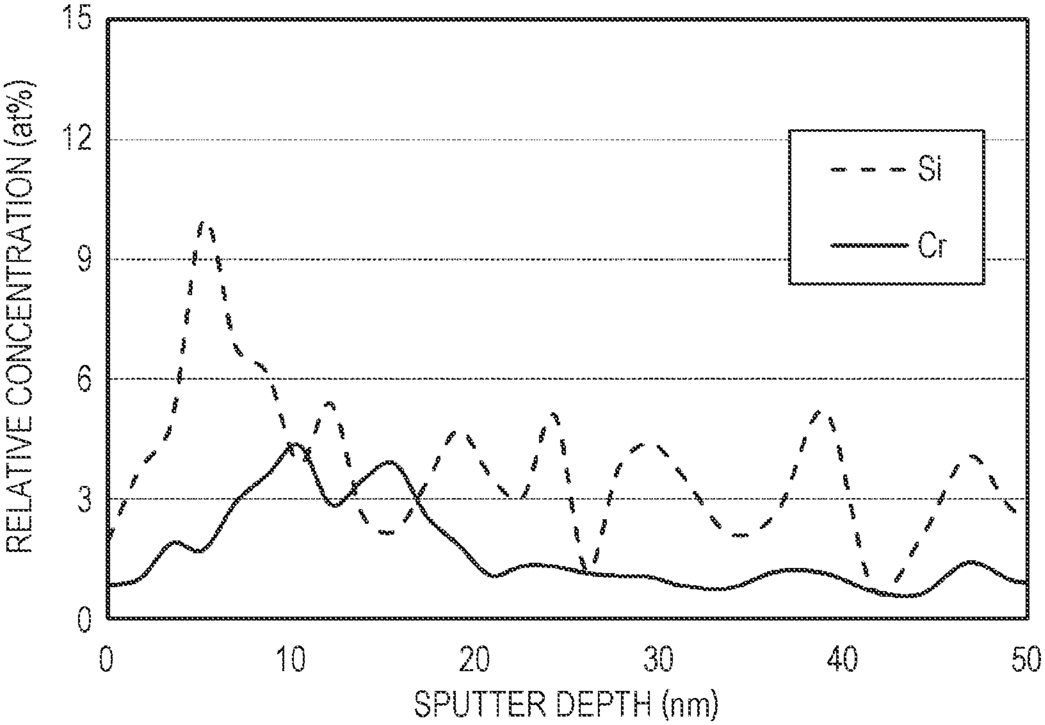
FIG. 13 is a graph of the depth profiles of the Si and Cr concentrations in the magnetic particle in the powder magnetic core according to Comparative Example 1.

FIG. 11 is a graph of the depth profiles of the Fe, C, and O (oxygen) concentrations in the magnetic particle in the powder magnetic core according to Comparative Example 1. FIG. 12 is an enlarged graph of the depth profiles of FIG. 11 expanded along the horizontal axis. More specifically, the range shown is from the surface to a depth of 50 nm. FIG. 13 is a graph of the depth profiles of the Si and Cr concentrations in the magnetic particle in the powder magnetic core according to Comparative Example 1. The same range as in FIG. 12 is shown.

Figure 14:
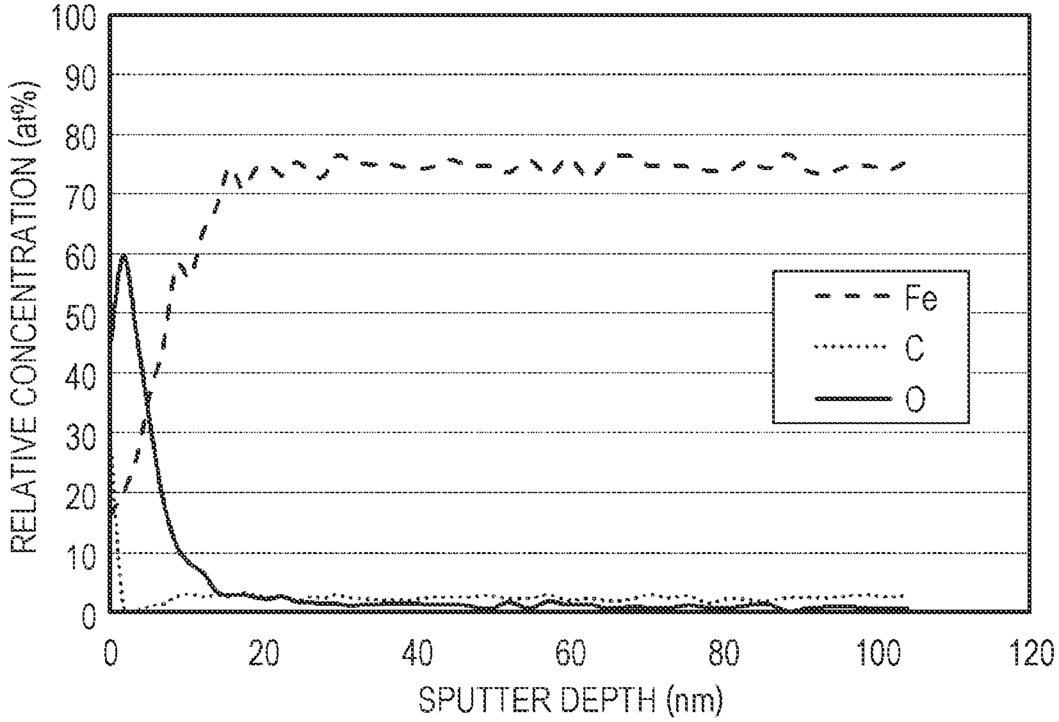
FIG. 14 is a graph of the depth profiles of the Fe, C, and O (oxygen) concentrations in a magnetic particle in a powder magnetic core according to Example 1.
Figure 15:
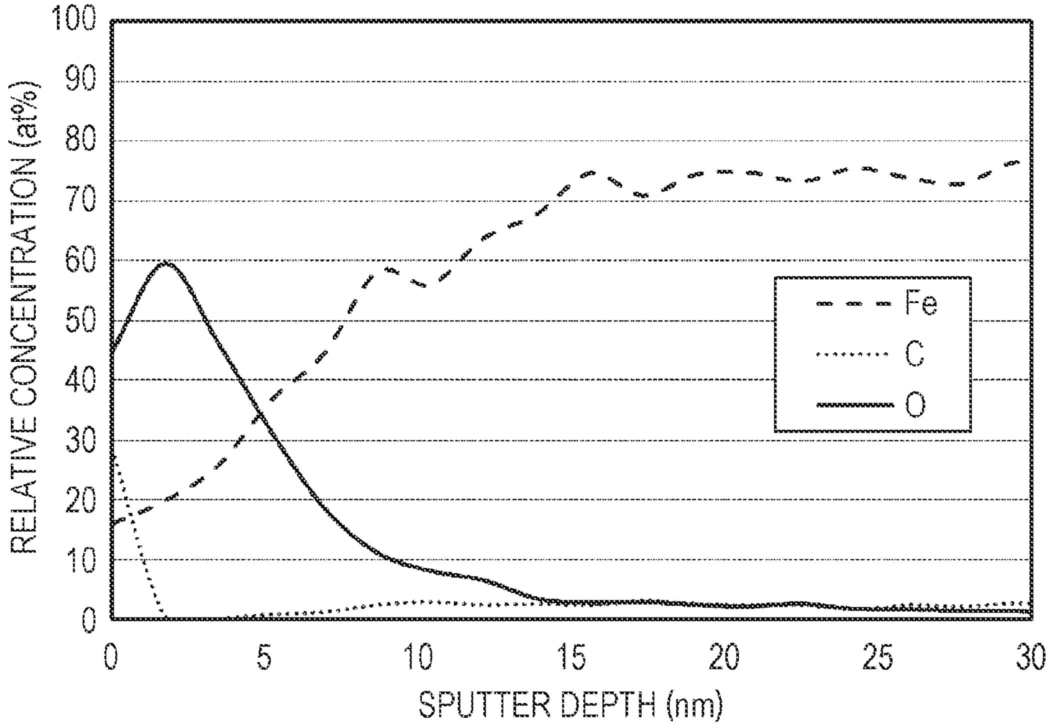
FIG. 15 is an enlarged graph of the depth profiles of FIG. 14 expanded along the horizontal axis.
Figure 16:
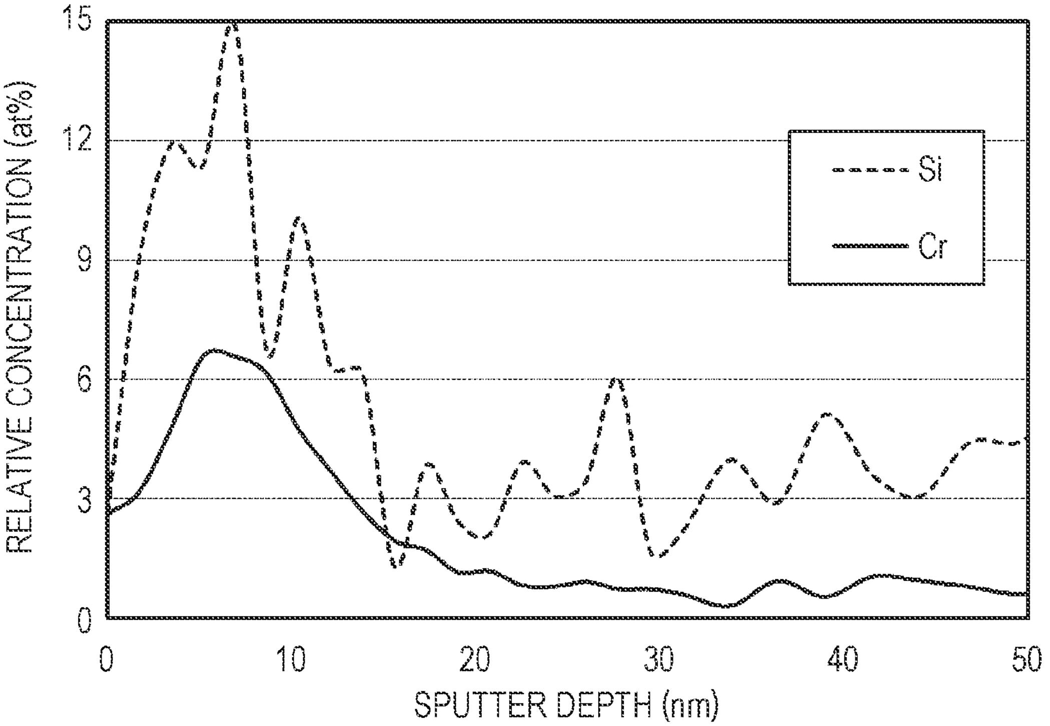
FIG. 16 is a graph of the depth profiles of the Si and Cr concentrations in the magnetic particle in the powder magnetic core according to Example 1.

FIG. 14 is a graph of the depth profiles of the Fe, C, and O (oxygen) concentrations in the magnetic particle in the powder magnetic core according to Example 1. FIG. 15 is an enlarged graph of the depth profiles of FIG. 14 expanded along the horizontal axis. More specifically, the range shown is from the surface to a depth of 30 nm. FIG. 16 is a graph of the depth profiles of the Si and Cr concentrations in the magnetic particle in the powder magnetic core according to Example 1. The range shown is from the surface to a depth of 50 nm.

Figure 17:
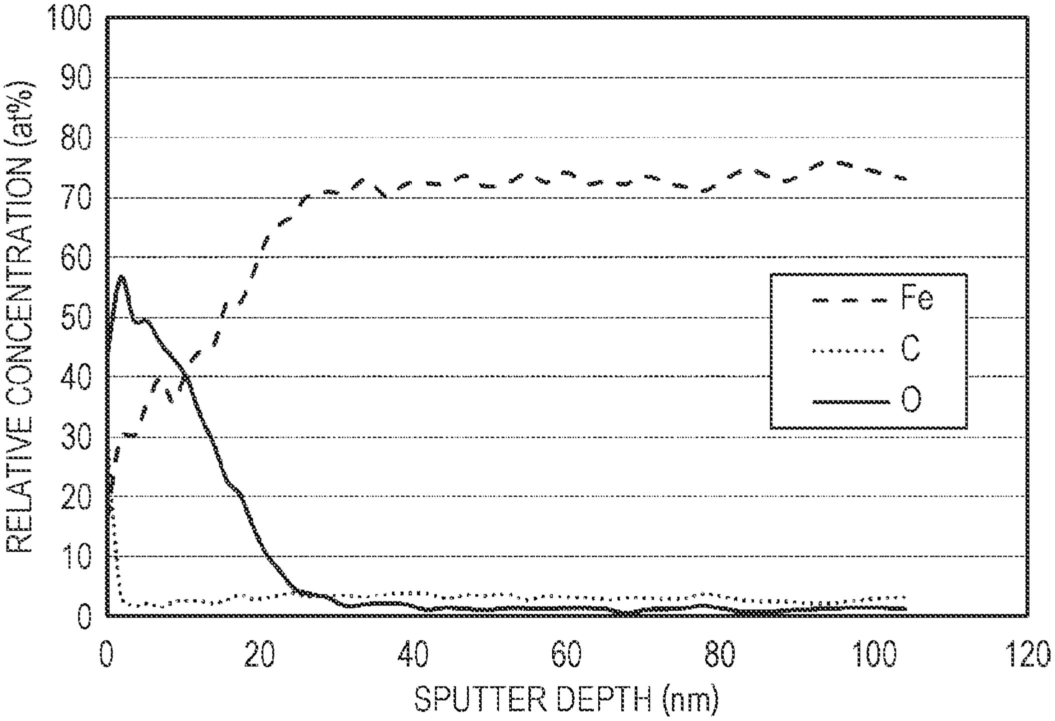
FIG. 17 is a graph of the depth profiles of the Fe, C, and O (oxygen) concentrations in a magnetic particle in a powder magnetic core according to Example 2.
Figure 18:
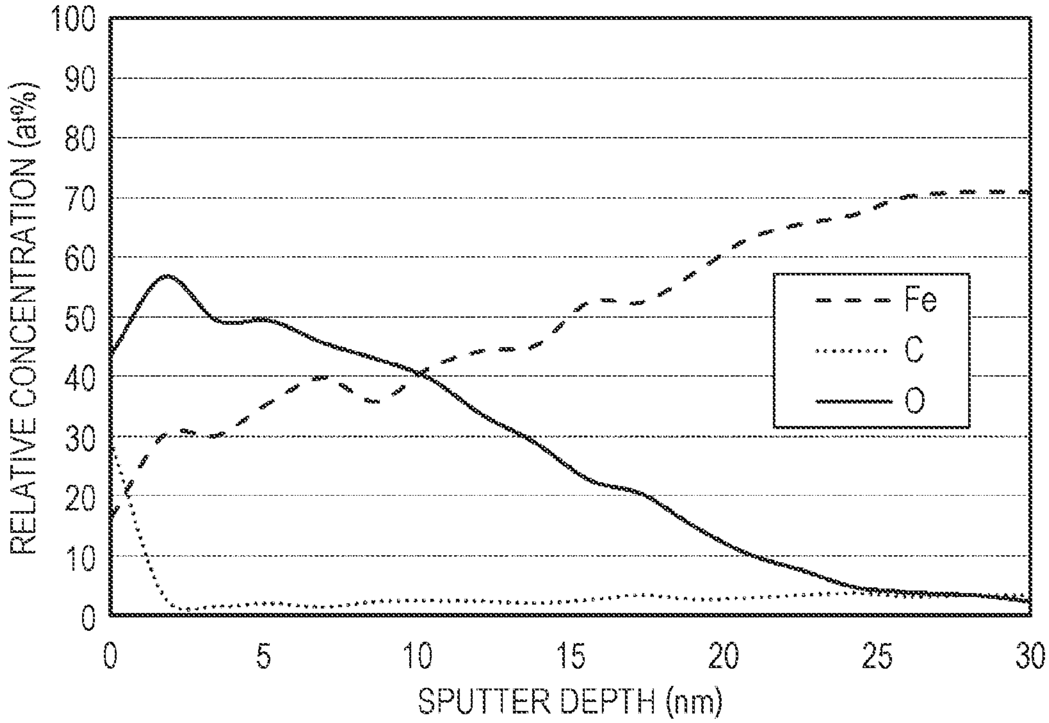
FIG. 18 is an enlarged graph of the depth profiles of FIG. 17 expanded along the horizontal axis.
Figure 19:
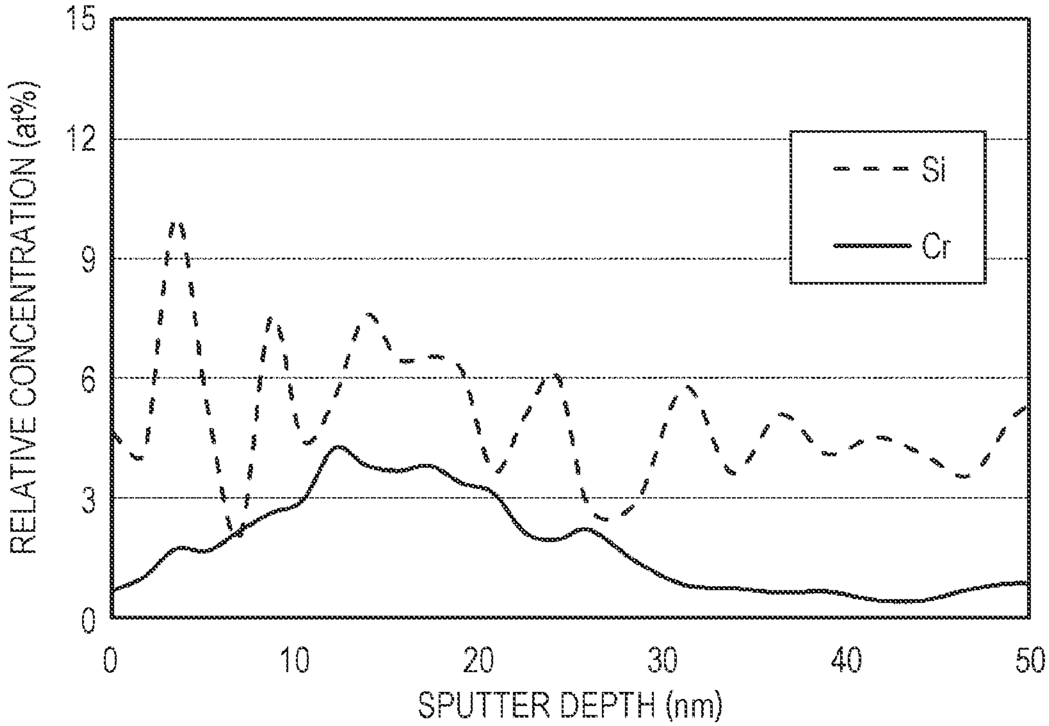
FIG. 19 is a graph of the depth profiles of the Si and Cr concentrations in the magnetic particle in the powder magnetic core according to Example 2.

FIG. 17 is a graph of the depth profiles of the Fe, C, and O (oxygen) concentrations in the magnetic particle in the powder magnetic core according to Example 2. FIG. 18 is an enlarged graph of the depth profiles of FIG. 17 expanded along the horizontal axis. More specifically, the range shown is from the surface to a depth of 30 nm. FIG. 19 is a graph of the depth profiles of the Si and Cr concentrations in the magnetic particle in the powder magnetic core according to Example 2. The range shown is from the surface to a depth of 50 nm.

Figure 20:
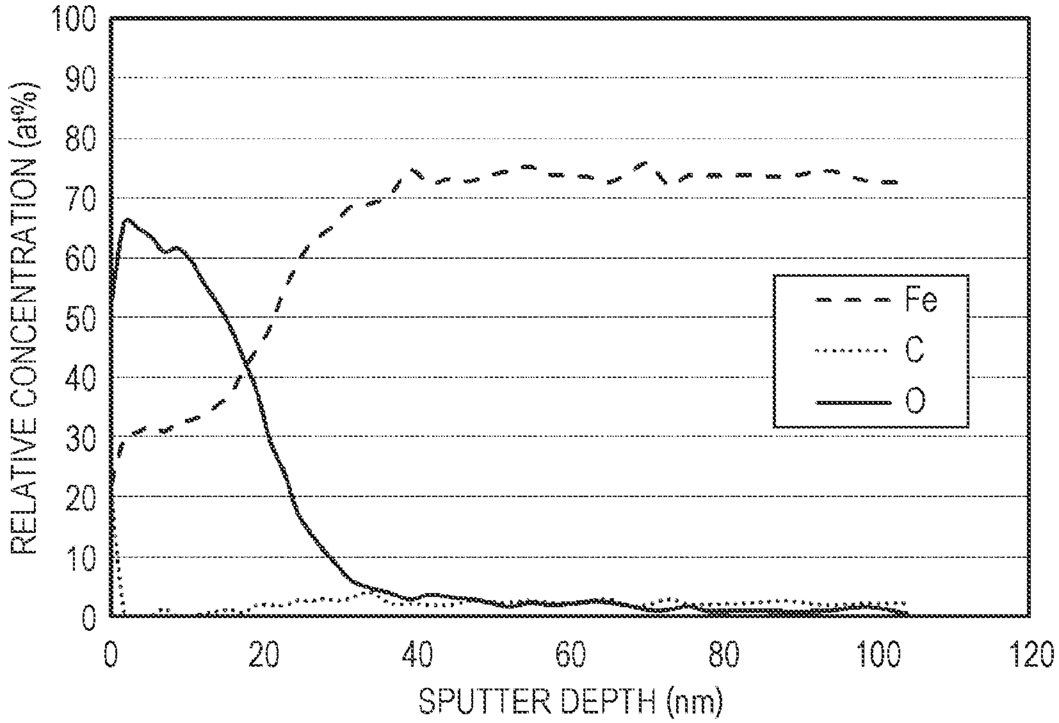
FIG. 20 is a graph of the depth profiles of the Fe, C, and O (oxygen) concentrations in a magnetic particle in a powder magnetic core according to Example 3.
Figure 21:
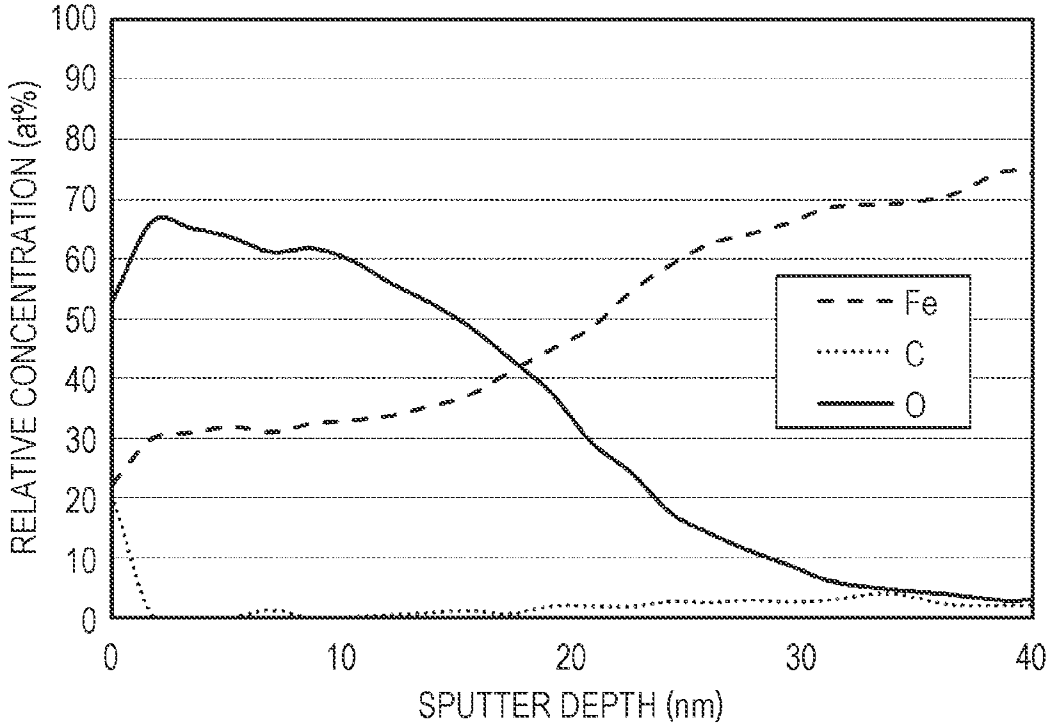
FIG. 21 is an enlarged graph of the depth profiles of FIG. 20 expanded along the horizontal axis.
Figure 22:
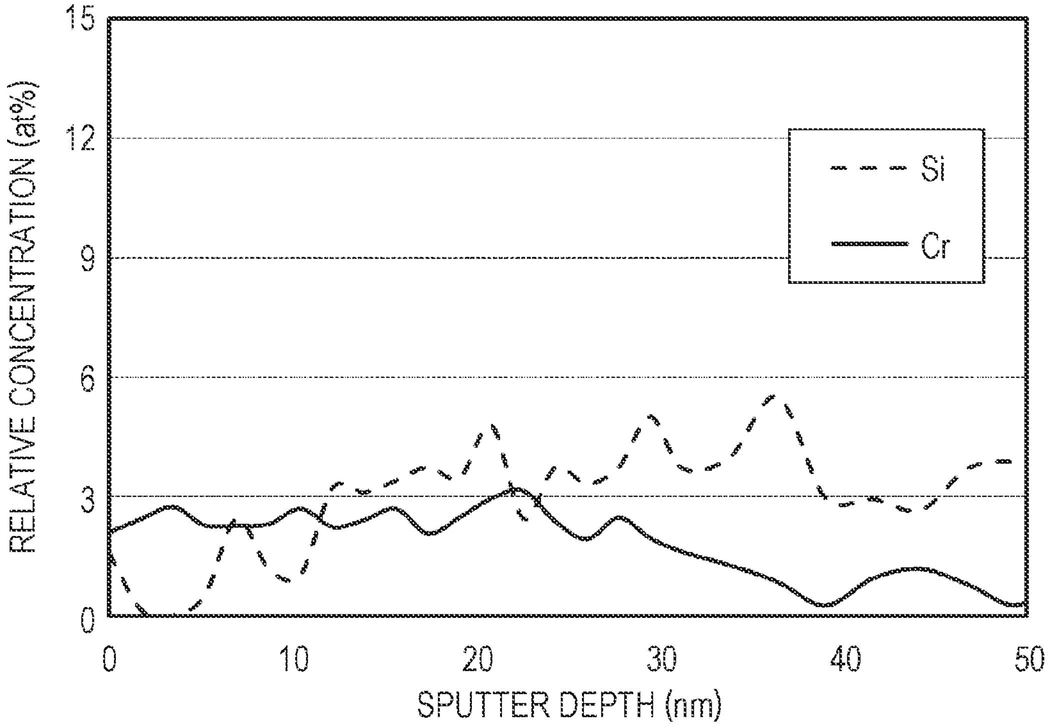
FIG. 22 is a graph of the depth profiles of the Si and Cr concentrations in the magnetic particle in the powder magnetic core according to Example 3.

FIG. 20 is a graph of the depth profiles of the Fe, C, and O (oxygen) concentrations in the magnetic particle in the powder magnetic core according to Example 3. FIG. 21 is an enlarged graph of the depth profiles of FIG. 20 expanded along the horizontal axis. More specifically, the range shown is from the surface to a depth of 40 nm. FIG. 22 is a graph of the depth profiles of the Si and Cr concentrations in the magnetic particle in the powder magnetic core according to Example 3. The range shown is from the surface to a depth of 50 nm.

Figure 23:
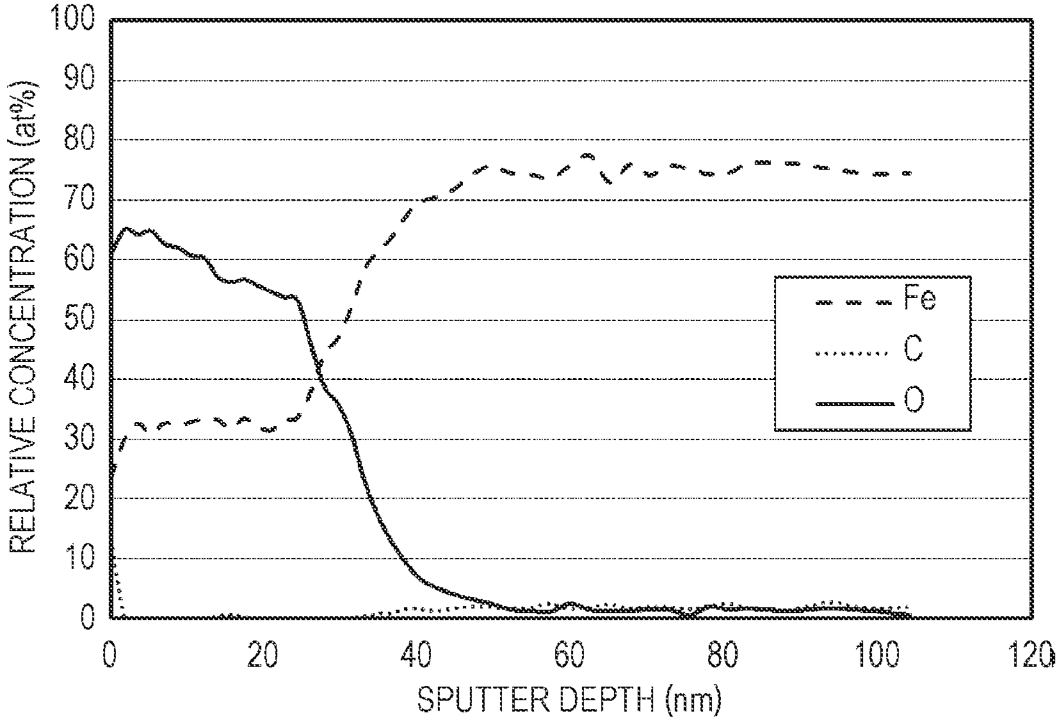
FIG. 23 is a graph of the depth profiles of the Fe, C, and O (oxygen) concentrations in a magnetic particle in a powder magnetic core according to Comparative Example 2.
Figure 24:
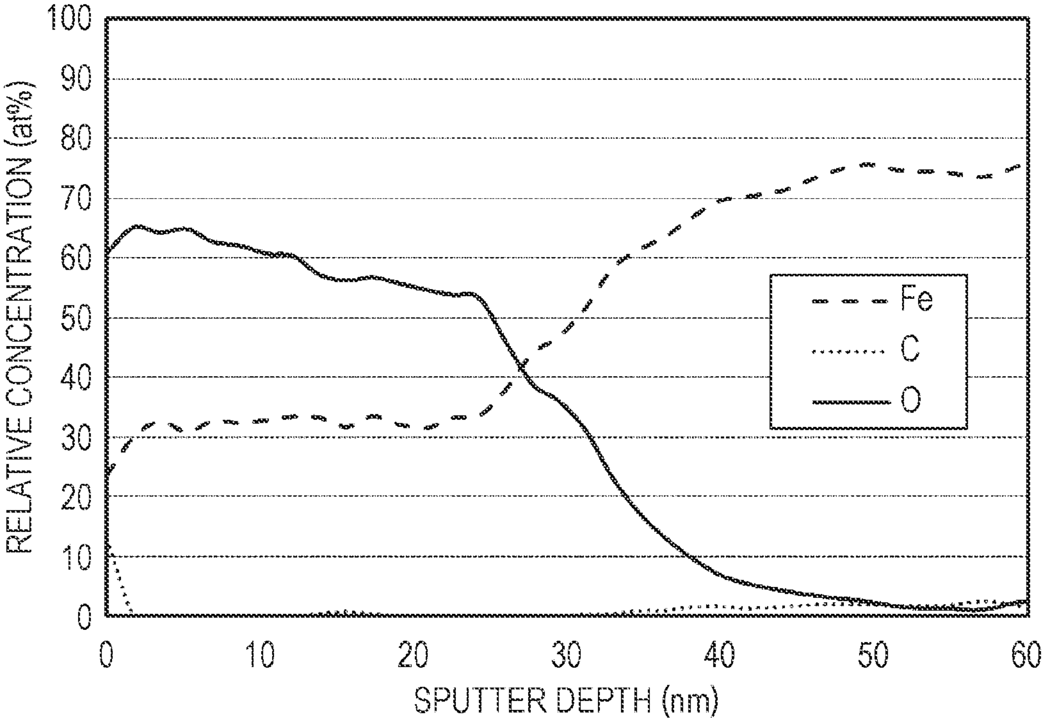
FIG. 24 is an enlarged graph of the depth profiles of FIG. 23 expanded along the horizontal axis.
Figure 25:
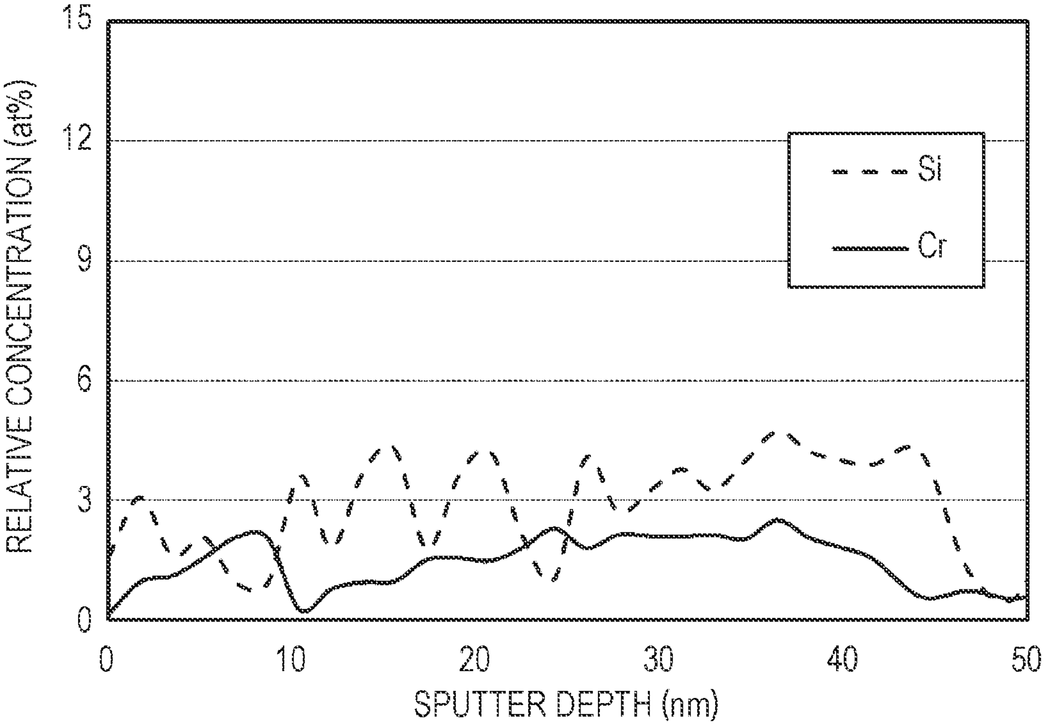
FIG. 25 is a graph of the depth profiles of the Si and Cr concentrations in the magnetic particle in the powder magnetic core according to Comparative Example 2.
Figure 26:
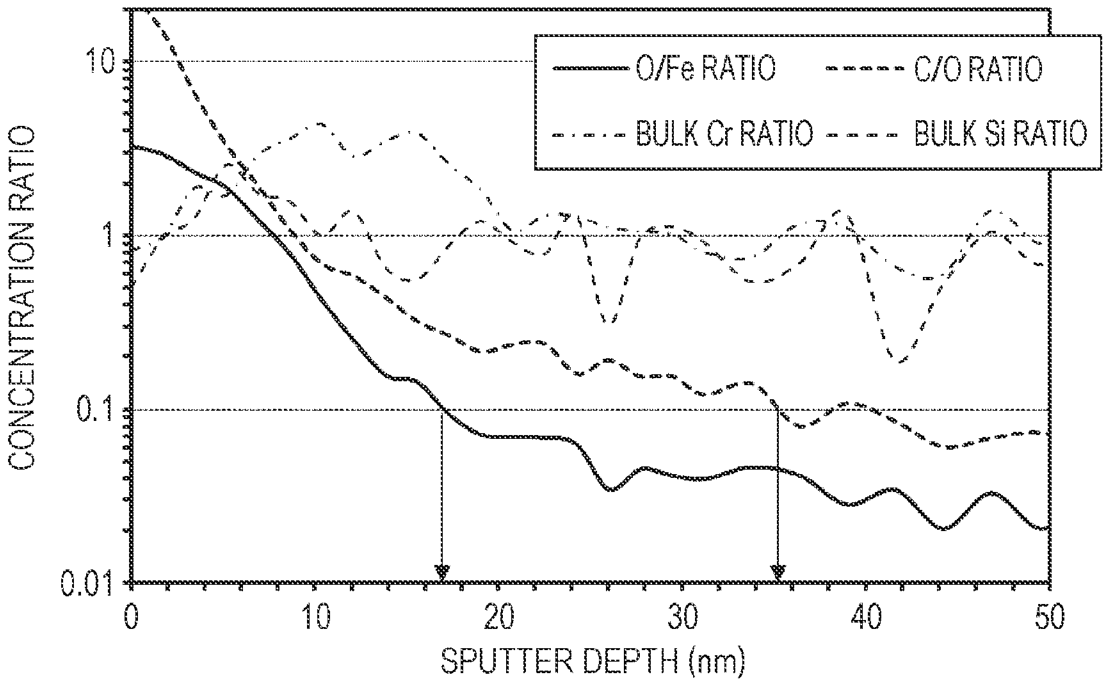
FIG. 26 is a graph of the depth profiles of the O/Fe ratio, C/O ratio, bulk Cr ratio, and bulk Si ratio in the magnetic particle in the powder magnetic core according to Comparative Example 1.
Figure 27:
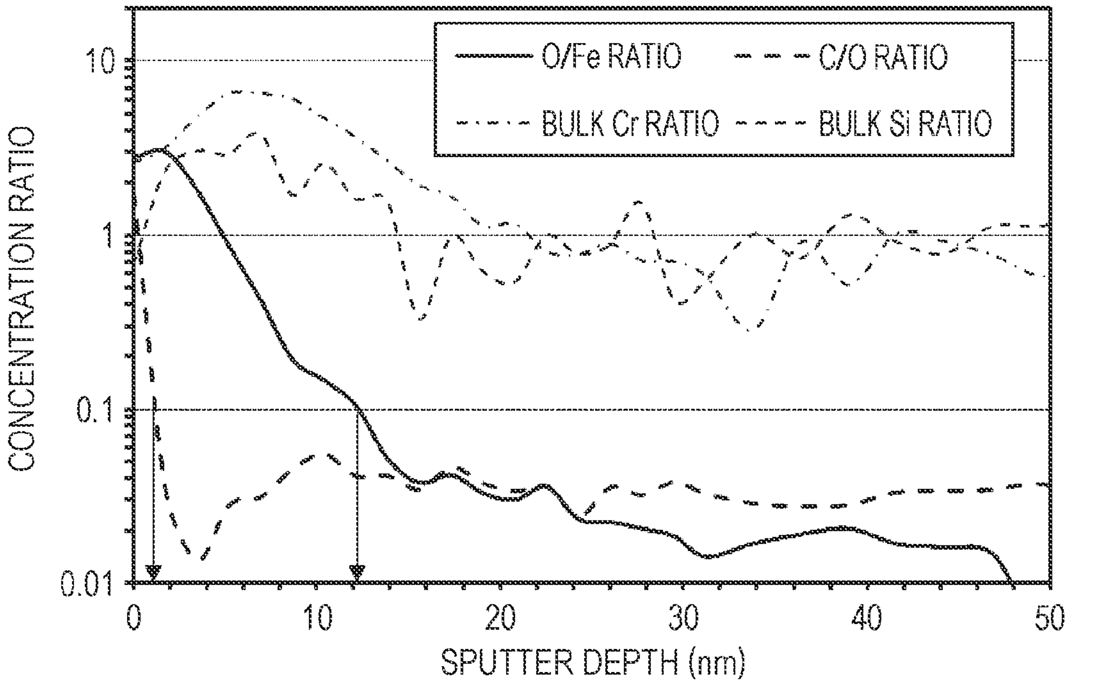
FIG. 27 is a graph of the depth profiles of the O/Fe ratio, C/O ratio, bulk Cr ratio, and bulk Si ratio in the magnetic particle in the powder magnetic core according to Example 1.
Figure 28:
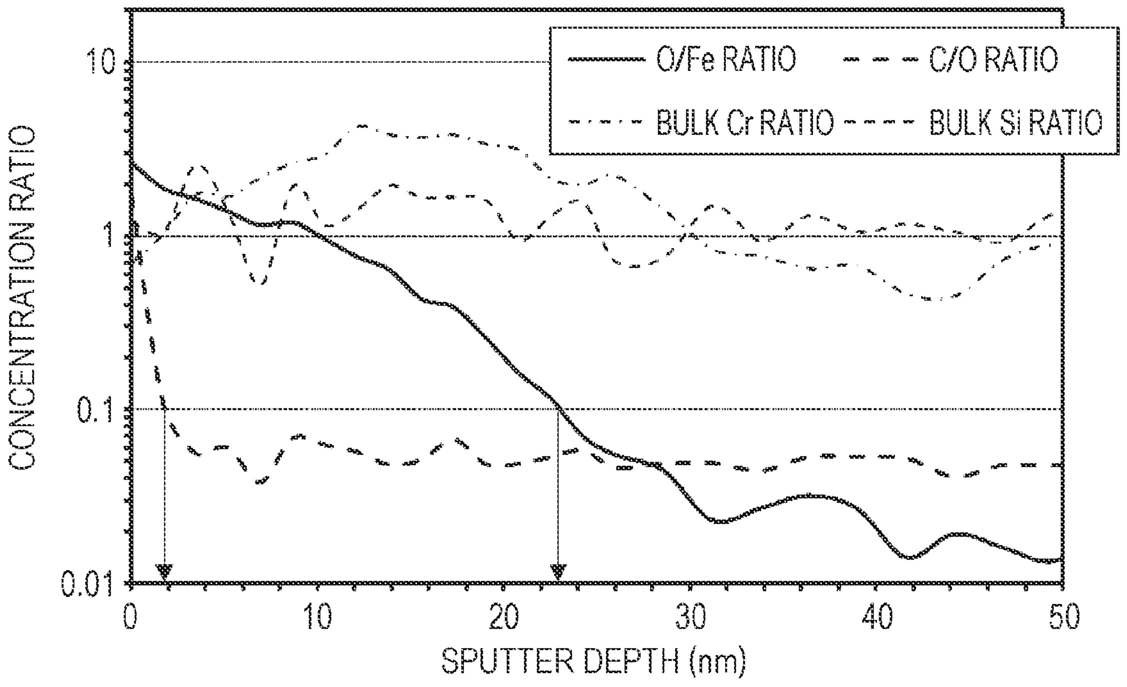
FIG. 28 is a graph of the depth profiles of the O/Fe ratio, C/O ratio, bulk Cr ratio, and bulk Si ratio in the magnetic particle in the powder magnetic core according to Example 2.
Figure 29:
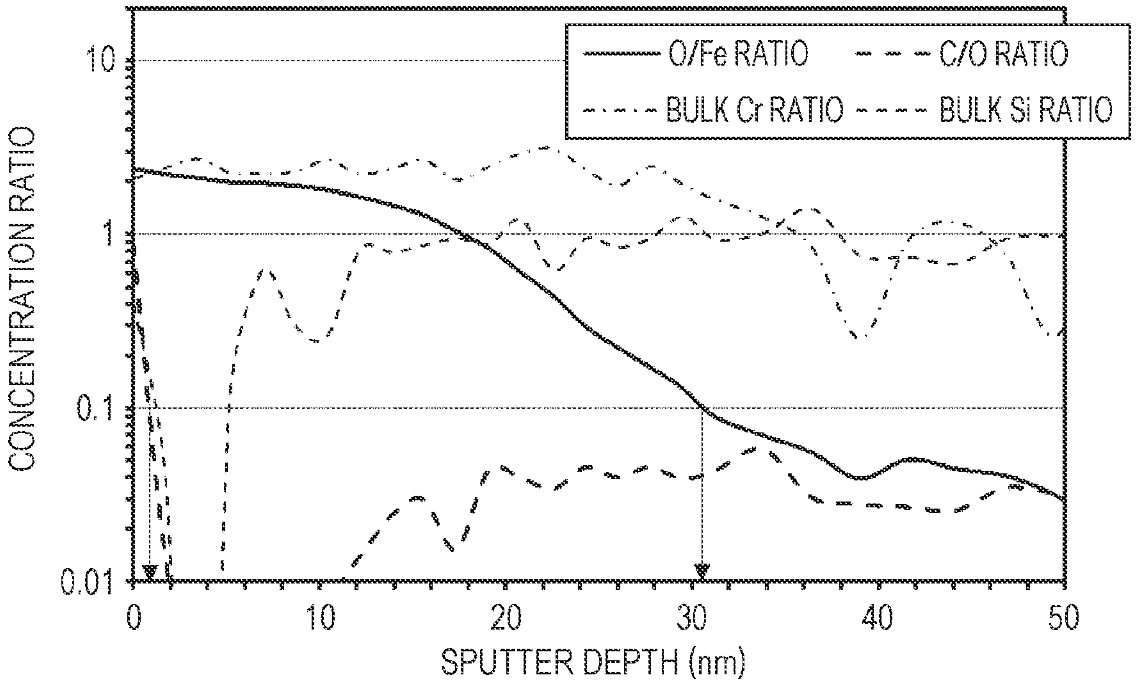
FIG. 29 is a graph of the depth profiles of the O/Fe ratio, C/O ratio, bulk Cr ratio, and bulk Si ratio in the magnetic particle in the powder magnetic core according to Example 3.
Figure 30:
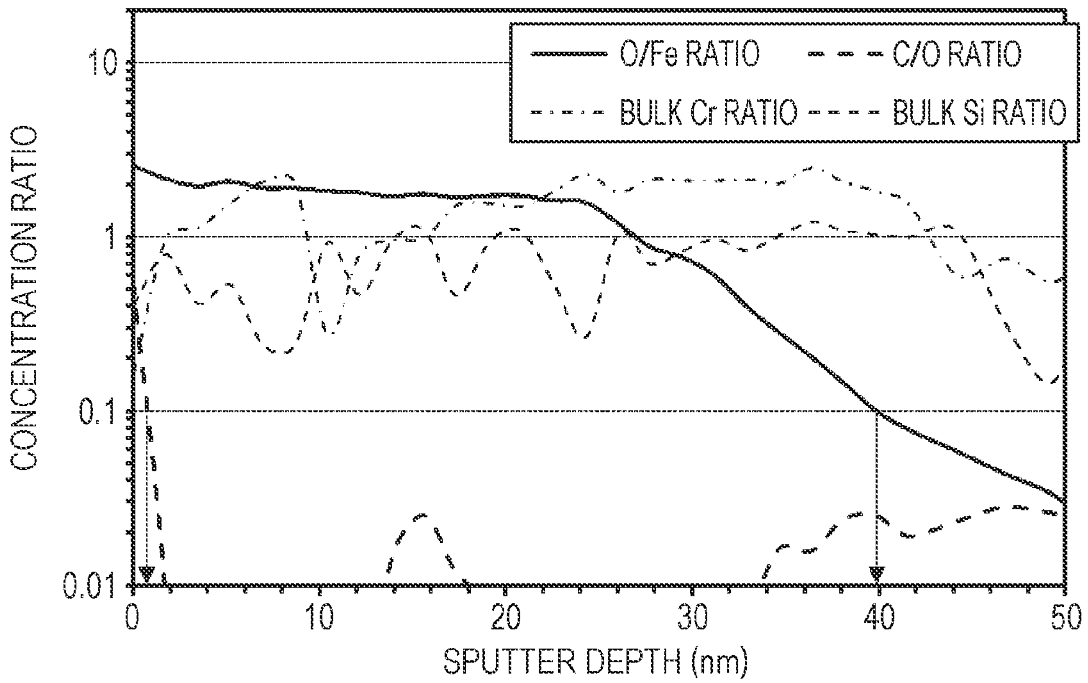
FIG. 30 is a graph of the depth profiles of the O/Fe ratio, C/O ratio, bulk Cr ratio, and bulk Si ratio in the magnetic particle in the powder magnetic core according to Comparative Example 2.
Figure 31:
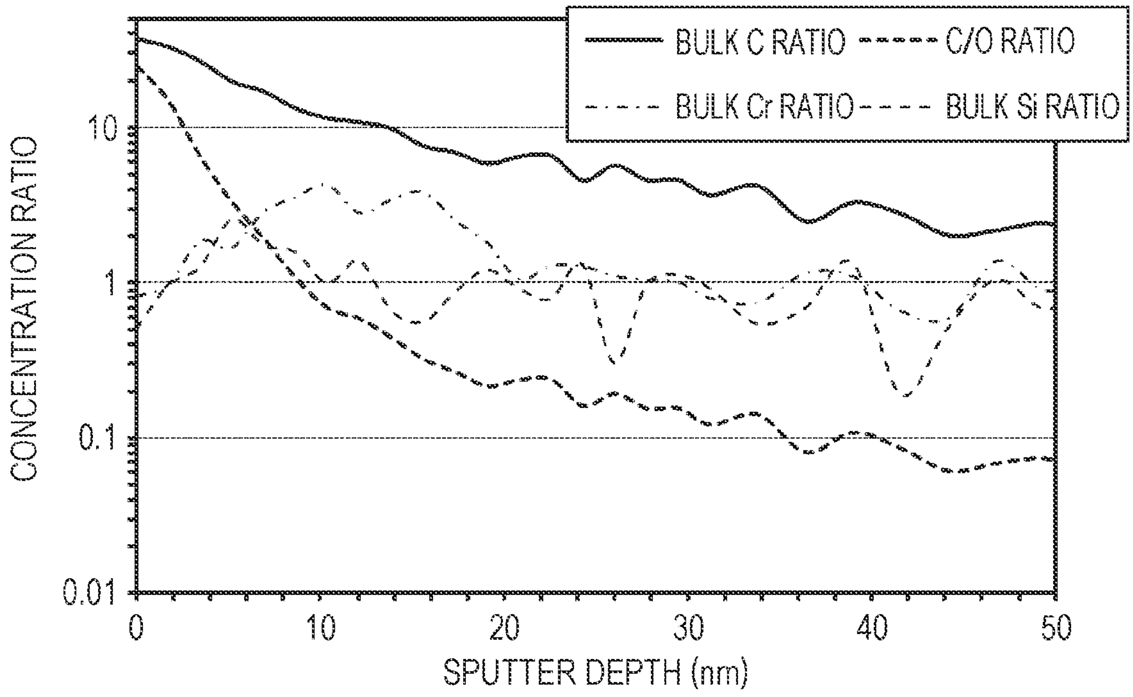
FIG. 31 is a graph of the depth profiles of the bulk C ratio, C/O ratio, bulk Cr ratio, and bulk Si ratio in the magnetic particle in the powder magnetic core according to Comparative Example 1.
Figure 32:
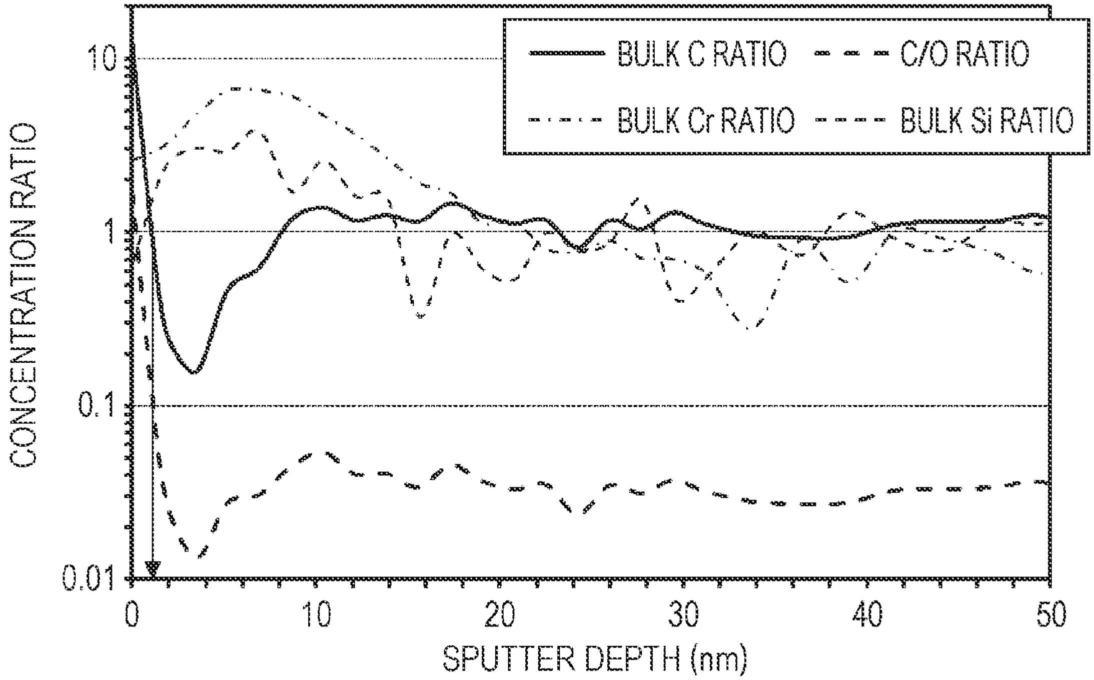
FIG. 32 is a graph of the depth profiles of the bulk C ratio, C/O ratio, bulk Cr ratio, and bulk Si ratio in the magnetic particle in the powder magnetic core according to Example 1.
Figure 33:
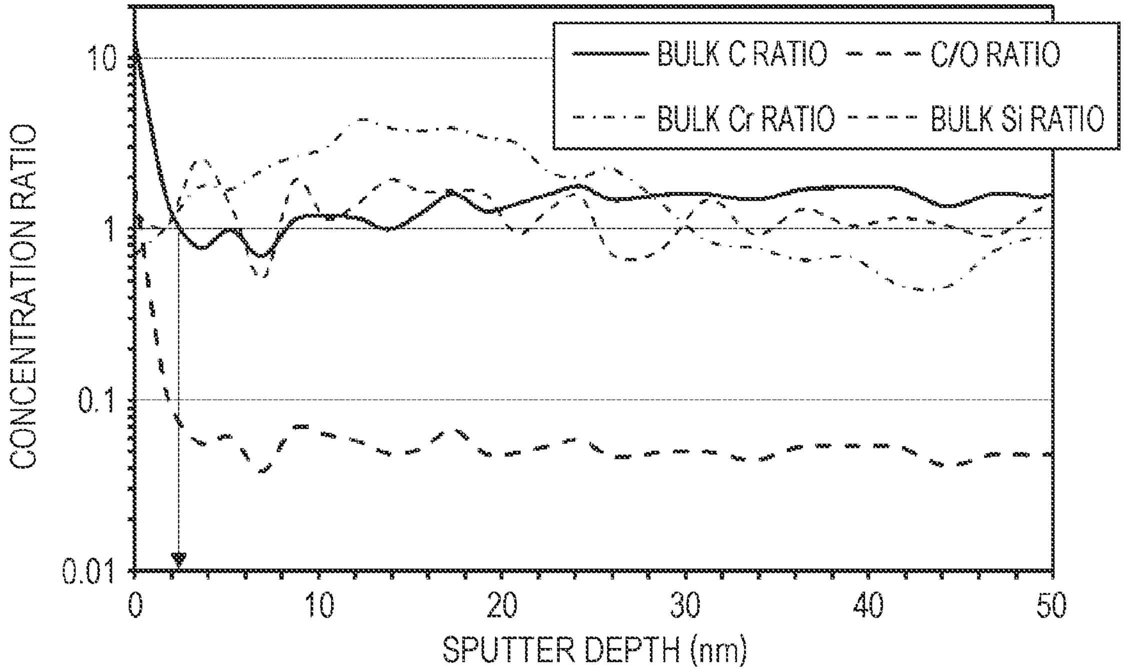
FIG. 33 is a graph of the depth profiles of the bulk C ratio, C/O ratio, bulk Cr ratio, and bulk Si ratio in the magnetic particle in the powder magnetic core according to Example 2.
Figure 34:
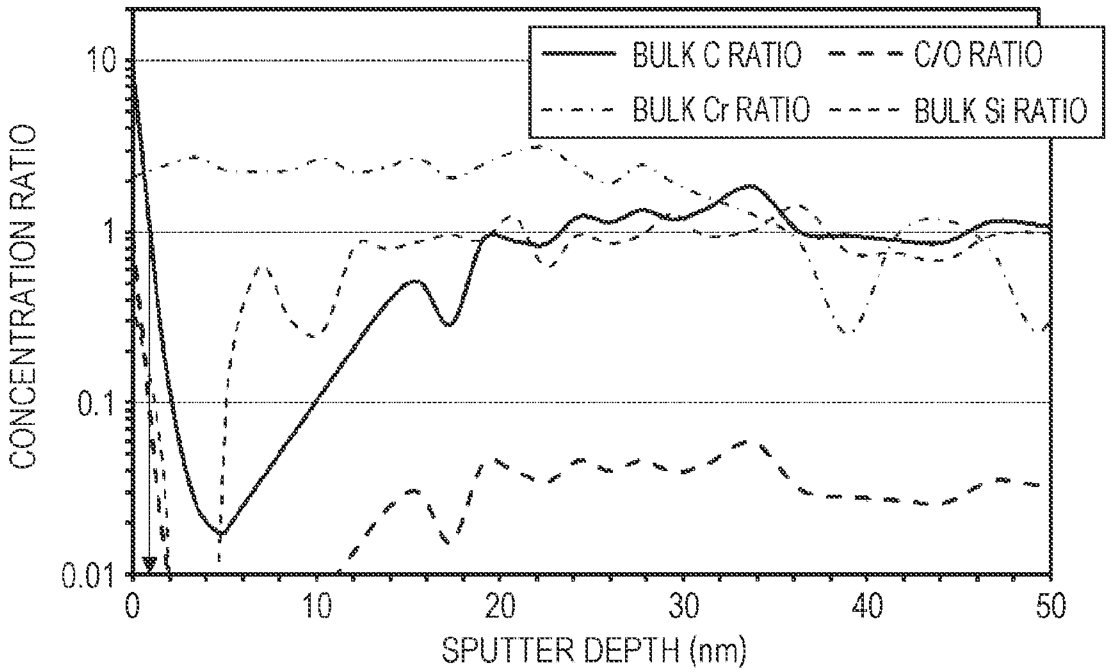
FIG. 34 is a graph of the depth profiles of the bulk C ratio, C/O ratio, bulk Cr ratio, and bulk Si ratio in the magnetic particle in the powder magnetic core according to Example 3.
Figure 35:
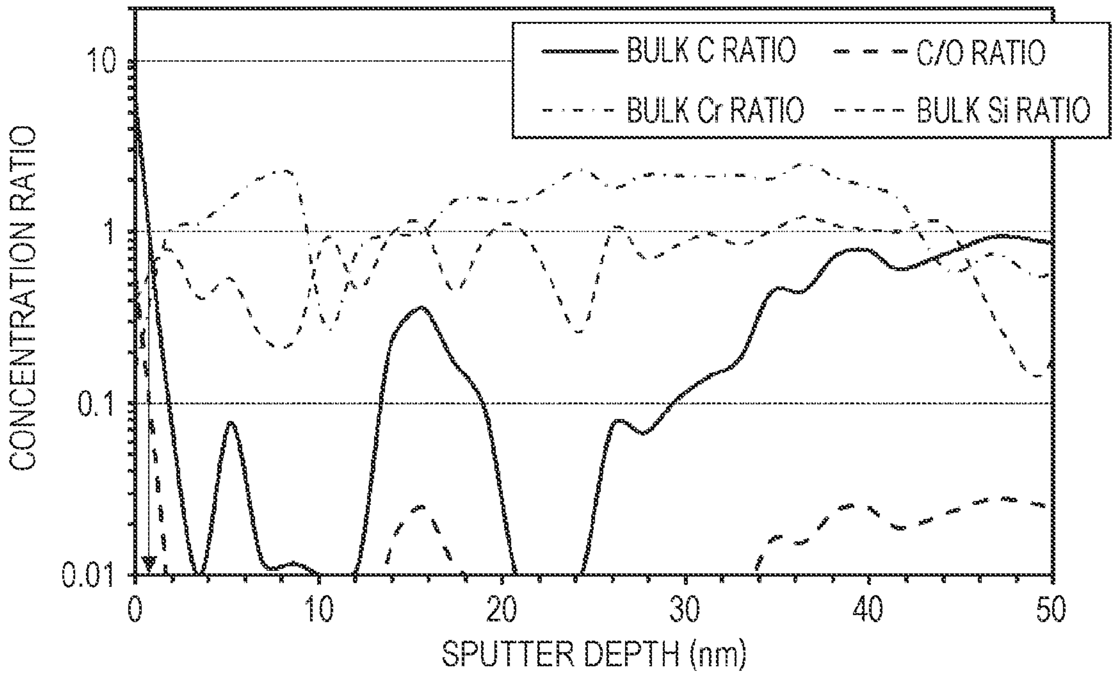
FIG. 35 is a graph of the depth profiles of the bulk C ratio, C/O ratio, bulk Cr ratio, and bulk Si ratio in the magnetic particle in the powder magnetic core according to Comparative Example 2.

FIG. 23 is a graph of the depth profiles of the Fe, C, and O (oxygen) concentrations in a magnetic particle in a powder magnetic core according to Comparative Example 2. FIG. 24 is an enlarged graph of the depth profiles of FIG. 23 expanded along the horizontal axis. More specifically, the range shown is from the surface to a depth of 60 nm. FIG. 25 is a graph of the depth profiles of the Si and Cr concentrations in the magnetic particle in the powder magnetic core according to Comparative Example 2. The range shown is from the surface to a depth of 50 nm.

The depth profiles of the O/Fe ratio, the C/O ratio, the bulk Cr ratio, and the bulk Si ratio were obtained from these results. FIGS. 26 to 30 show the results. The depth profile of the bulk C ratio was also obtained. FIGS. 31 to 35 show the results together with the depth profiles of the C/O ratio, the bulk Cr ratio, and the bulk Si ratio.

The thickness (unit: nm) of the oxygen-containing region and the thickness (unit: nm) of the carbon-containing region were determined on the basis of the depth profiles shown in FIGS. 26 to 30. Table 7 shows the results. The thickness of the oxygen-containing region was defined as the thickness of the region in which the ratio (O/Fe ratio) of the O concentration (unit: atomic percent) to the Fe concentration (unit: atomic percent) was 0.1 or more, and the thickness of the carbon-containing region was defined as the thickness of the region in which the ratio (C/O ratio) of the C concentration (unit: atomic percent) to the O concentration was 1 or more.

TABLE 7

| | Oxygen-containing region (nm) | Carbon-containing region (nm) | Cr-concentrated portion | Si-concentrated portion | Carbon-concentrated region (nm) | μ' (H/m) | Pcv ($kW/m^3$) |
|---|---|---|---|---|---|---|---|
| Comparative example 1 | 17 | 35 | B | B | >50 | 47.6 | 548 |
| Example 1 | 12 | 1 | A | A | 1 | 49.7 | 251 |
| Example 2 | 23 | 2 | A | A | 2 | 46.5 | 216 |
| Example 3 | 31 | 1 | A | C | 1 | 44.0 | 243 |
| Comparative example 2 | 40 | 1 | B | C | 1 | 40.4 | 286 |

As shown in Table 7, in the depth profiles of the magnetic particles according to the examples including the first heat treatment and the second heat treatment in the heat-treatment step, the oxygen-containing region could be defined and had a thickness of 35 nm or less. More specifically, the thickness of the oxygen-containing region may be defined as 31 nm or less, 23 nm or less, or 12 nm or less from Examples 1 to 3. On the other hand, in the depth profiles according to the examples, the carbon-containing region could be defined and had a thickness of 5 nm or less. More specifically, the thickness was 2 nm or less or 1 nm or less from Examples 1 to 3. In contrast, in Comparative Example 1, in which the second heat treatment was not performed and the first temperature was held in the nonoxidizing atmosphere, the thickness of the oxygen-containing region was 17 nm, whereas the thickness of the carbon-containing region was 35 nm or less. The carbon-containing region was thicker than the oxygen-containing region. In Comparative Example 2, in which the first heat treatment was not performed and the temperature was increased in the oxidizing atmosphere, the thickness of the oxygen-containing region was 40 nm, which exceeded 35 nm.

On the basis of the depth profiles of FIGS. 26 to 30, the extent to which the oxygen-containing region had a Cr-concentrated portion, which was a portion with a bulk Cr ratio of more than 1, was evaluated in accordance with the following evaluation criteria. Table 7 shows the results.

A: The oxygen-containing region was almost entirely the Cr-concentrated portion.

B: There was a portion where the Cr-concentrated portion could not be defined except for a very surface portion of the oxygen-containing region.

The C concentration tends to be particularly high in the very surface portion of the oxygen-containing region. Thus, the Cr concentration in this portion is sometimes measured to be lower than the Cr content in the alloy composition of the magnetic particle.

On the basis of the depth profiles of FIGS. 26 to 30, the extent to which the oxygen-containing region had a Si-concentrated portion, which was a portion with a bulk Si ratio of more than 1, was evaluated in accordance with the following evaluation criteria. Table 7 shows the results.

A: The oxygen-containing region could be almost entirely defined as the Si-concentrated portion.

B: The oxygen-containing region could be partly defined as the Si-concentrated portion.

C: Almost the whole of the oxygen-containing region could not be defined as the Si-concentrated portion.

On the basis of the depth profiles of FIGS. 31 to 35, whether a carbon-concentrated region with a bulk C ratio of more than 1 could be defined was determined. If possible, the thickness of the carbon-concentrated region was determined. In the depth profile of the magnetic particle in the powder magnetic core, the carbon-concentrated region was measured by defining from the surface of the magnetic particle a carbon-concentrated region in which the ratio of the C concentration to the C content (unit: atomic percent) in the alloy composition of the magnetic particle ("bulk C ratio") was more than 1. Although a region with a bulk C ratio of more than 1 may be present in a region other than a region continuous to the surface, such a region was not defined as a carbon-concentrated region in the measurement.

Table 7 shows the measurement results of the carbon-concentrated region. Although the carbon-concentrated region could be defined in Examples 1 to 3 and Comparative Example 2, the thickness of the carbon-concentrated region in Comparative Example 1 was as large as more than 50 nm. In the other examples, the thickness of the carbon-concentrated region was 2 nm or less or 1 nm or less.

(Test Example 2) Measurement of Initial Permeability

The initial permeability μ' of a toroidal coil formed by winding a coated copper wire 34 times around the powder magnetic core formed in the examples was measured with an impedance analyzer ("42841A" manufactured by HP) at 100 kHz. Table 7 shows the results. As shown in Table 7, Example 1 had a higher initial permeability μ' than Comparative Examples 1 and 2. On the other hand, the initial permeability μ' in Examples 2 and 3 was slightly lower than but almost the same as the initial permeability μ' in Comparative Example 1. Examples 2 and 3 had a higher initial permeability μ' than Comparative Example 2.

(Test Example 3) Measurement of Iron Loss

The iron loss (unit: $kW/m^3$) of a toroidal coil formed by winding a coated copper wire 40 times on the primary side and 10 times on the secondary side of the powder magnetic core formed in the examples was measured with a BH analyzer ("SY-8218" manufactured by Iwatsu Electric Co., Ltd.) at an effective maximum magnetic flux density Bm of 100 mT and at a measurement frequency of 100 kHz. Table 7 shows the results. As shown in Table 7, the toroidal coils according to Examples 1 to 3 had a lower iron loss Pcv than the toroidal coils according to Comparative Examples 1 and 2.

The measurement results of the initial permeability μ' and the iron loss Pcv show that the iron loss Pcv of Comparative Example 1 was at least twice the iron loss Pcv of Examples 1 to 3 and that the toroidal coils of Examples 1 to 3 had a particularly small iron loss Pcv, though Examples 1 to 3 had almost the same initial permeability μ' as Comparative Example 1. Furthermore, the toroidal coil according to Comparative Example 2 was inferior to the toroidal coils according to Examples 1 to 3 in both initial permeability μ' and iron loss Pcv. Thus, it can be understood that the toroidal coils according to the examples of the present invention have better initial permeability μ' and iron loss Pcv than the toroidal coils according to the comparative examples.

(Test Example 4) Heat Resistance Test

Figure 36:
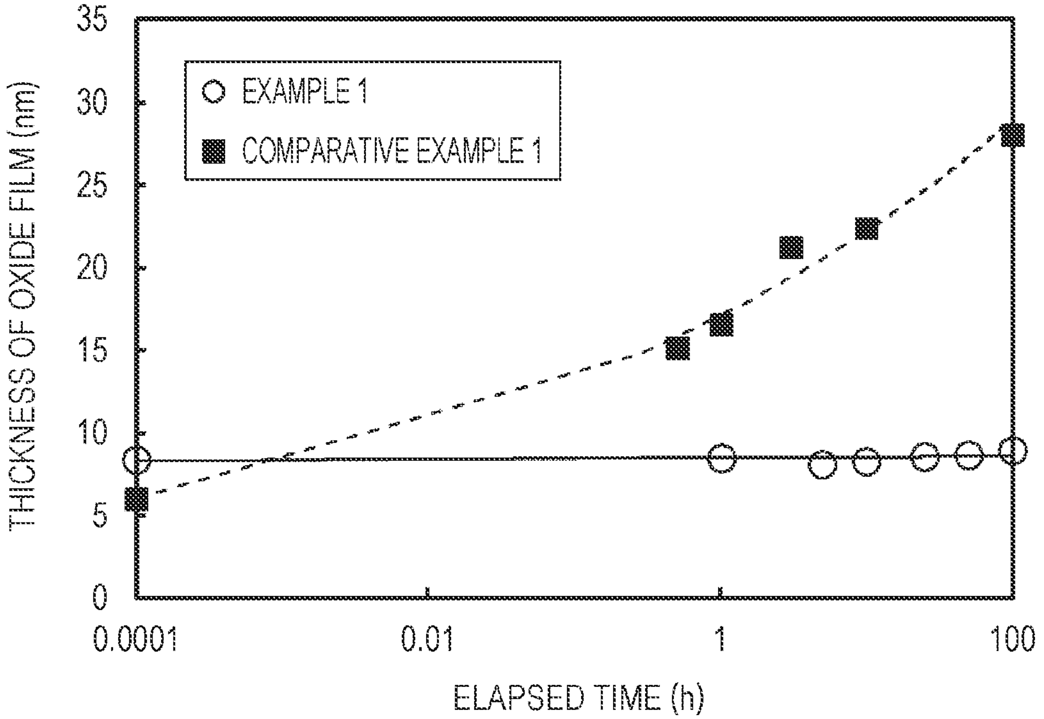
FIG. 36 is a graph of the relationship between the thickness of an oxide film and the elapsed time.

The powder magnetic core according to Example 1 and the powder magnetic core according to Comparative Example 1 were subjected to a heat resistance test in a high-temperature environment of 250° C. (in the air). At different elapsed times in the high-temperature environment, the depth profile of the oxygen concentration in each powder magnetic core was measured after the test. In the depth profile, the depth at which the oxygen concentration was 50% of the peak oxygen concentration was taken as the thickness of the oxide film. FIG. 36 shows the relationship between the thickness of an oxide film and the elapsed time. As shown in FIG. 36, the thickness of the oxide film in the powder magnetic core according to Example 1 does not particularly increase with the elapsed time, whereas the thickness of the oxide film in the powder magnetic core according to Comparative Example 1 tends to increase with the elapsed time. In the powder magnetic core according to Example 1, in which the thickness of the oxide film changed little, the magnetic characteristics were less likely to change even in a high-temperature environment.

Figure 37:
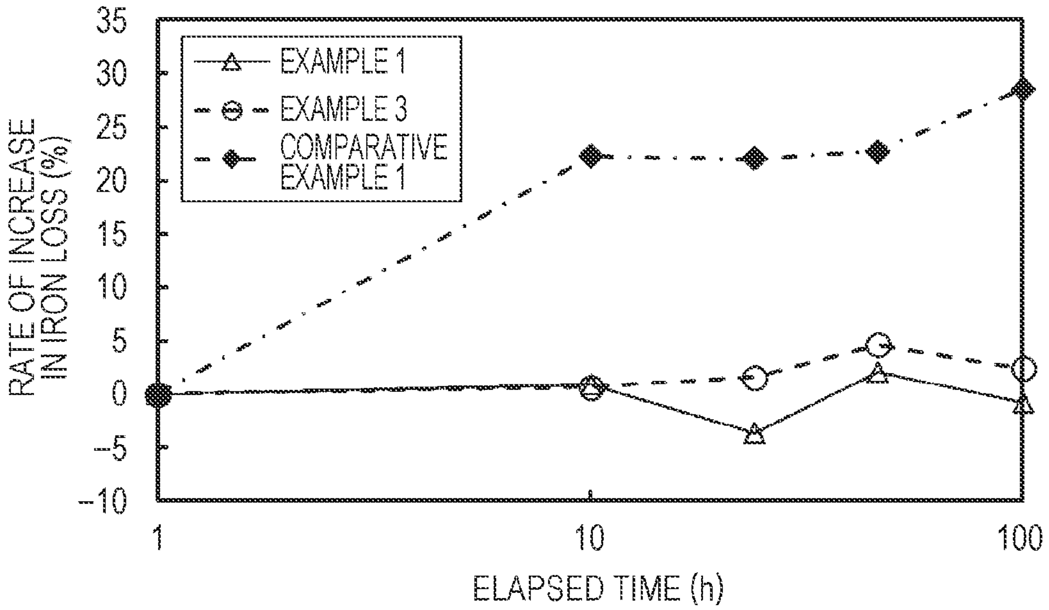
FIG. 37 is a graph of the relationship between the rate of increase in iron loss Pcv and the elapsed time.

The powder magnetic cores according to Examples 1 and 3 and the powder magnetic core according to Comparative Example 1 were subjected to a heat resistance test in a high-temperature environment of 250° C. (in the air). At different elapsed times in the high-temperature environment, the iron loss Pcv in each powder magnetic core was measured by the method of Test Example 3 after the test. FIG. 37 shows the results (the relationship between the rate of increase in iron loss Pcv and the elapsed time). As shown in FIG. 37, the increase in iron loss Pcv was small in the powder magnetic cores according to Examples 1 and 3, whereas the iron loss Pcv tended to increase over time in the powder magnetic core according to Comparative Example 1.

Examples 11 to 16

An Fe-based alloy composition listed in Table 8 was prepared by melting, and a soft magnetic material (magnetic particles) composed of a powder was formed by a gas atomization method.

TABLE 8

| | Alloy composition (atomic percent) | | | | | | Binder | |
|---|---|---|---|---|---|---|---|---|
| | Fe | Cr | P | C | B | Si | Resin | Inorganic component |
| Example 11 | 77.9 | 1 | 7.3 | 2.2 | 7.7 | 3.9 | Acrylic resin 1 | None |
| Example 12 | 77.9 | 1 | 7.3 | 2.2 | 7.7 | 3.9 | Acrylic resin 2 | Phosphate glass |
| Example 13 | 77.9 | 1 | 7.3 | 2.2 | 7.7 | 3.9 | Acrylic resin 3 | None |
| Example 14 | 74.4 | 2 | 9 | 2.2 | 7.5 | 4.9 | Acrylic resin 3 | Phosphate glass |
| Example 15 | 76.4 | 2 | 10.8 | 2.2 | 4.2 | 4.4 | Acrylic resin 3 | Phosphate glass |
| Example 16 | 87.5 | 2.5 | 0 | 1.7 | 2.5 | 6.8 | Acrylic resin 1 | None |

The magnetic particle was mixed with an acrylic resin and/or inorganic components, phosphate glass, zinc stearate, and silica, to prepare a slurry in the same manner as in Example 1. The amounts of the acrylic resin, zinc stearate, and silica were the same as in Example 1. As shown in Table 8, the phosphate glass, if present, was 0.4% by mass, which was the same as in Example 1. The phosphate glass was not mixed in some examples (Example 11, etc.). Three types of acrylic resins were used. In Table 8, the use of the same acrylic resin as in Example 1 is described as "acrylic resin 1", and the use of another acrylic resin is described as "acrylic resin 2" or "acrylic resin 3". The acrylic resins had a thermal decomposition temperature of approximately 360° C. A mixed powder was prepared from the slurry in the same manner as in Example 1. A formed product was also formed from the mixed powder in the same manner as in Example 1.

TABLE 9

| | Second heat treatment | | Third heat treatment | |
|---|---|---|---|---|
| | μ' (H/m) | Pcv (kW/m$^3$) | μ' (H/m) | Pcv (kW/m$^3$) |
| Example 11 | 66.6 | 222 | 62.4 | 403 |
| Example 12 | 44.8 | 250 | 42.1 | 373 |
| Example 13 | 60.7 | 222 | 57.8 | 312 |
| Example 14 | 63.5 | 248 | 59.4 | 403 |
| Example 15 | 95.5 | 268 | 85.3 | 503 |
| Example 16 | 53.5 | 558 | 51.5 | 711 |

The formed product was subjected to the heat-treatment step including the second heat treatment in the same manner as in Example 1 to form a powder magnetic core.

Another formed product was prepared by the above production method and was subjected to a heat-treatment step including a third heat treatment in which the furnace temperature was 440° C. but the nitrogen atmosphere was maintained, instead of the second heat treatment of Example 1, thus forming a powder magnetic core.

The initial permeability and iron loss Pcv of these powder magnetic cores were measured. Table 9 shows the results. As shown in Table 9, in all examples, the second heat treatment in which the furnace temperature of 440° C. was held for 3 hours in the oxidizing atmosphere resulted in a higher initial permeability μ' and a lower iron loss Pcv than the third heat treatment in the nonoxidizing atmosphere.

Electrical and electronic components including a powder magnetic core produced by a production method according to the present invention can be suitable for magnetic cores for use in power inductors, booster circuits in hybrid vehicles and the like, and reactors, transformers, choke coils, and motors used in power generation and transformer equipment.

What is claimed is:

1. A powder magnetic core comprising:

magnetic powder of an Fe-based Cr-containing amorphous alloy; and an organic binding substance, wherein a depth profile of a composition of a magnetic powder particle determined with respect to a depth measured from a surface of the magnetic powder particle exhibits:

an oxygen-containing region, which is defined as a region in which a ratio of an O concentration (unit: atomic percent) to an Fe concentration (unit: atomic percent) is equal to or greater than 0.1, having a depth equal to or smaller than 35 nm from the surface of the magnetic powder particle; and a carbon-containing region, which is defined as a region in which a ratio of a C concentration (unit: atomic percent) to the O concentration is equal to or greater than 1, having—a depth equal to or smaller than 5 nm from the surface of the magnetic powder particle, and wherein the oxygen-containing region includes a portion in which a ratio of a Cr concentration (unit: atomic percent) to a Cr content (unit: atomic percent) in an alloy composition of the magnetic powder particle is greater than 1.

2. The powder magnetic core according to claim 1, wherein the oxygen-containing region includes a portion in which a ratio of a Si concentration (unit: atomic percent) to a Si content (unit: atomic percent) in the alloy composition of the magnetic powder particle is greater than 1.

3. The powder magnetic core according to claim 1, wherein the depth profile further exhibits:

a carbon-concentrated region, which is defined as a region in which a ratio of the C concentration to a C content (unit: atomic percent) in the alloy composition of the magnetic powder particle is greater than 1, having a depth equal to or smaller than 2 nm from the surface of the magnetic powder particle.

4. The powder magnetic core according to claim 1, wherein the Fe— based Cr-containing amorphous alloy further contains P and C.

5. A method for producing the powder magnetic core according to claim 1, comprising:

a mixing step of preparing a mixed powder containing magnetic powder particles of an Fe-based Cr-containing amorphous alloy and an organic binder;

a forming step of pressing the mixed powder to form a formed product; and a heat-treatment step including strain relief heat treatment by setting a temperature of an atmosphere at a strain relief temperature of the formed product to relieve a strain of the formed product, the heat-treatment step including:

a first heat treatment in which the atmosphere is kept nonoxidizing until a first temperature is reached, the first temperature being equal to or higher than a thermal decomposition temperature of the organic binder and equal to or lower than the strain relief temperature; and a second heat treatment following the first heat treatment, performed at a temperature range including the first temperature, the atmosphere in the second heat treatment being oxidizing.

6. The method for producing a powder magnetic core according to claim 5, wherein the heat-treatment step further includes:

a cooling step following the second heat treatment, in which the atmosphere is made and kept nonoxidizing while the temperature is being decreased from the temperature range including the first temperature.

7. The method for producing a powder magnetic core according to claim 5, wherein the first temperature is the strain relief temperature.

8. The method for producing a powder magnetic core according to claim 5, wherein the first temperature is different from the strain relief temperature, and the second heat treatment is followed by changing the temperature of the atmosphere to the strain relief temperature and performing the strain relief heat treatment while the atmosphere at the strain relief temperature is nonoxidizing.

* * * * *